US011545172B1

(12) United States Patent
Chu

(10) Patent No.: US 11,545,172 B1
(45) Date of Patent: Jan. 3, 2023

(54) SOUND SOURCE LOCALIZATION USING REFLECTION CLASSIFICATION

(71) Applicant: Amazon Technologies, Inc., Seattle, WA (US)

(72) Inventor: Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 17/195,904

(22) Filed: Mar. 9, 2021

(51) Int. Cl.
| G10L 25/51 | (2013.01) |
| G10L 25/21 | (2013.01) |
| G10L 15/22 | (2006.01) |
| G06N 3/08 | (2006.01) |
| G10L 15/16 | (2006.01) |
| G10L 15/08 | (2006.01) |

(52) U.S. Cl.
CPC ............... *G10L 25/51* (2013.01); *G06N 3/08* (2013.01); *G10L 15/16* (2013.01); *G10L 15/22* (2013.01); *G10L 25/21* (2013.01); *G10L 2015/088* (2013.01)

(58) Field of Classification Search
CPC ......... G10L 25/51; G10L 15/16; G10L 15/22; G10L 25/21; G10L 2015/088; G10L 25/06; G10L 21/0308; G10L 25/18; G10L 25/78; G06N 3/08; H04R 1/1083; H04R 3/005; H04R 2410/05; H04R 1/1008; H04R 1/406; H04R 2410/01; G10K 11/178; G10K 2210/3028; G10K 11/175; G10K 2210/3011; G10K 2210/30231
See application file for complete search history.

(56) References Cited

U.S. PATENT DOCUMENTS

| 5,485,524 | A | * | 1/1996 | Kuusama | ............... | H03G 9/025 704/226 |
| 7,197,456 | B2 | * | 3/2007 | Haverinen | .............. | G10L 15/20 704/226 |
| 8,213,598 | B2 | * | 7/2012 | Bendersky | ............... | H04B 3/23 379/406.13 |
| 8,271,279 | B2 | * | 9/2012 | Hetherington | ...... | G10L 21/0216 704/211 |

(Continued)

FOREIGN PATENT DOCUMENTS

| CN | 110120217 A | * | 8/2019 | ............. | G10L 15/22 |
| EP | 3467819 A1 | * | 4/2019 | ............. | G06F 3/165 |

*Primary Examiner* — Mohammad K Islam
(74) *Attorney, Agent, or Firm* — Pierce Atwood LLP

(57) ABSTRACT

A system configured to perform sound source localization (SSL) using reflection classification is provided. A device processes audio data representing sounds from multiple sound sources to generate sound track data that includes an individual sound track for each of the sound sources. To detect reflections, the device determines whether a pair of sound tracks are strongly correlated. For example, the device may calculate a correlation value for each pairwise combination of the sound tracks and determine whether the correlation value exceeds a threshold value. When the correlation value exceeds the threshold, the device invokes a reflection classifier trained to distinguish between direct sound sources and reflected sound sources. For example, the device extracts feature data from the pair of sound tracks and processes the feature data using a trained model to determine which of the sound tracks corresponds to the direct sound source.

20 Claims, 15 Drawing Sheets

(56) References Cited

U.S. PATENT DOCUMENTS

| | | | | |
|---|---|---|---|---|
| 8,750,491 B2* | 6/2014 | Prakash | ............ | H04M 9/082 |
| | | | | 379/406.05 |
| 8,798,992 B2* | 8/2014 | Gay | ............ | G10L 21/028 |
| | | | | 704/226 |
| 8,914,282 B2* | 12/2014 | Konchitsky | ............ | G10L 21/0208 |
| | | | | 704/226 |
| 9,043,203 B2* | 5/2015 | Rettelbach | ............ | G10L 19/0204 |
| | | | | 704/226 |
| 9,088,328 B2* | 7/2015 | Gunzelmann | ............ | H04B 1/1036 |
| 9,202,463 B2* | 12/2015 | Newman | ............ | G10L 25/78 |
| 9,613,612 B2* | 4/2017 | Perkmann | ............ | G10K 11/17861 |
| 9,640,179 B1* | 5/2017 | Hart | ............ | G10L 21/0208 |
| 9,653,060 B1* | 5/2017 | Hilmes | ............ | H04M 9/082 |
| 9,659,555 B1* | 5/2017 | Hilmes | ............ | H04R 3/005 |
| 9,792,897 B1* | 10/2017 | Kaskari | ............ | G10L 15/20 |
| 9,818,425 B1* | 11/2017 | Ayrapetian | ............ | G10L 21/0224 |
| 9,959,886 B2* | 5/2018 | Anhari | ............ | G10L 25/78 |
| 10,134,425 B1* | 11/2018 | Johnson, Jr. | ............ | G10L 15/05 |
| 10,192,567 B1* | 1/2019 | Kamdar | ............ | G10L 25/84 |
| 2009/0265169 A1* | 10/2009 | Dyba | ............ | G10L 19/012 |
| | | | | 704/E15.001 |
| 2013/0332175 A1* | 12/2013 | Setiawan | ............ | G10L 19/012 |
| | | | | 704/500 |
| 2014/0214676 A1* | 7/2014 | Bukai | ............ | G10L 17/24 |
| | | | | 705/44 |
| 2015/0302845 A1* | 10/2015 | Nakano | ............ | G10L 25/15 |
| | | | | 704/267 |
| 2018/0357995 A1* | 12/2018 | Lee | ............ | G10K 11/178 |
| 2019/0108837 A1* | 4/2019 | Christoph | ............ | G06F 3/165 |
| 2019/0222943 A1* | 7/2019 | Andersen | ............ | H04R 25/507 |
| 2019/0259381 A1* | 8/2019 | Ebenezer | ............ | H04R 3/005 |
| 2020/0058320 A1* | 2/2020 | Liu | ............ | G10L 15/22 |
| 2020/0243061 A1* | 7/2020 | Sun | ............ | G10K 11/17854 |
| 2022/0246161 A1* | 8/2022 | Verbeke | ............ | H03F 3/183 |

* cited by examiner

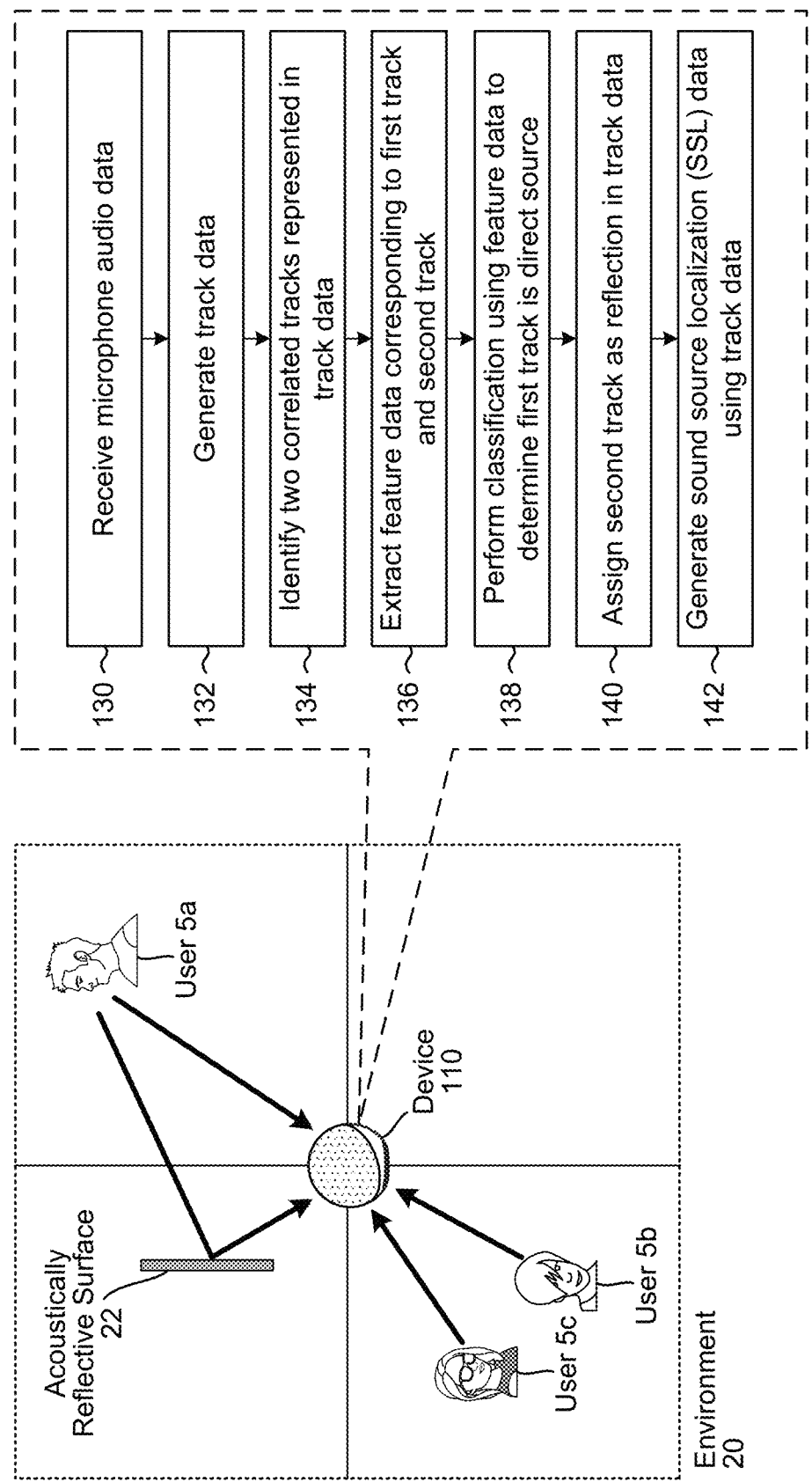

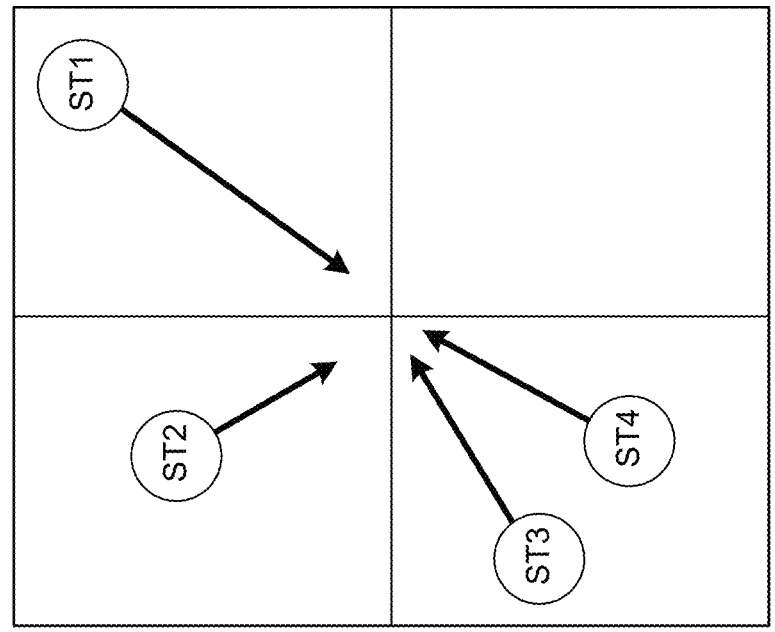
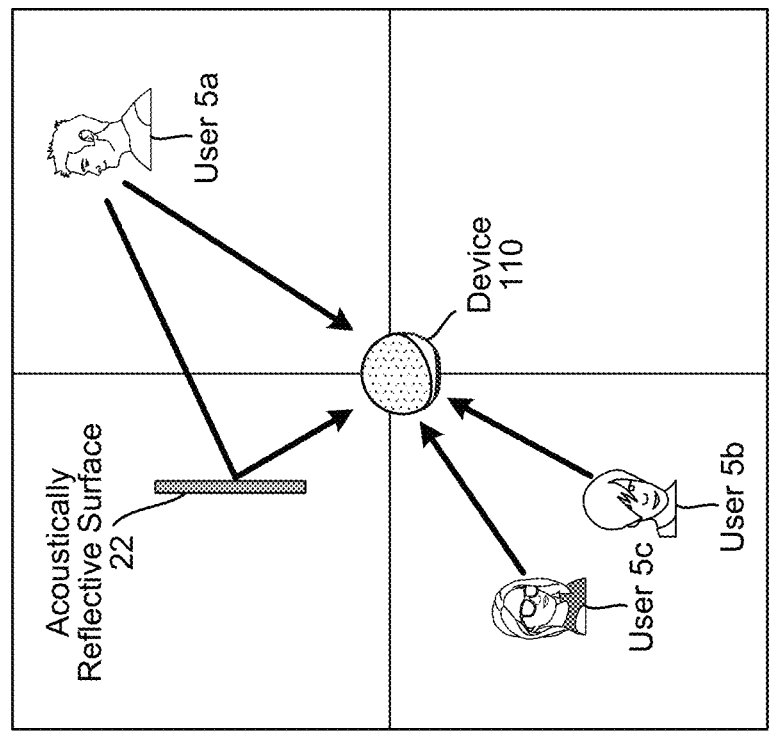
FIG. 2A

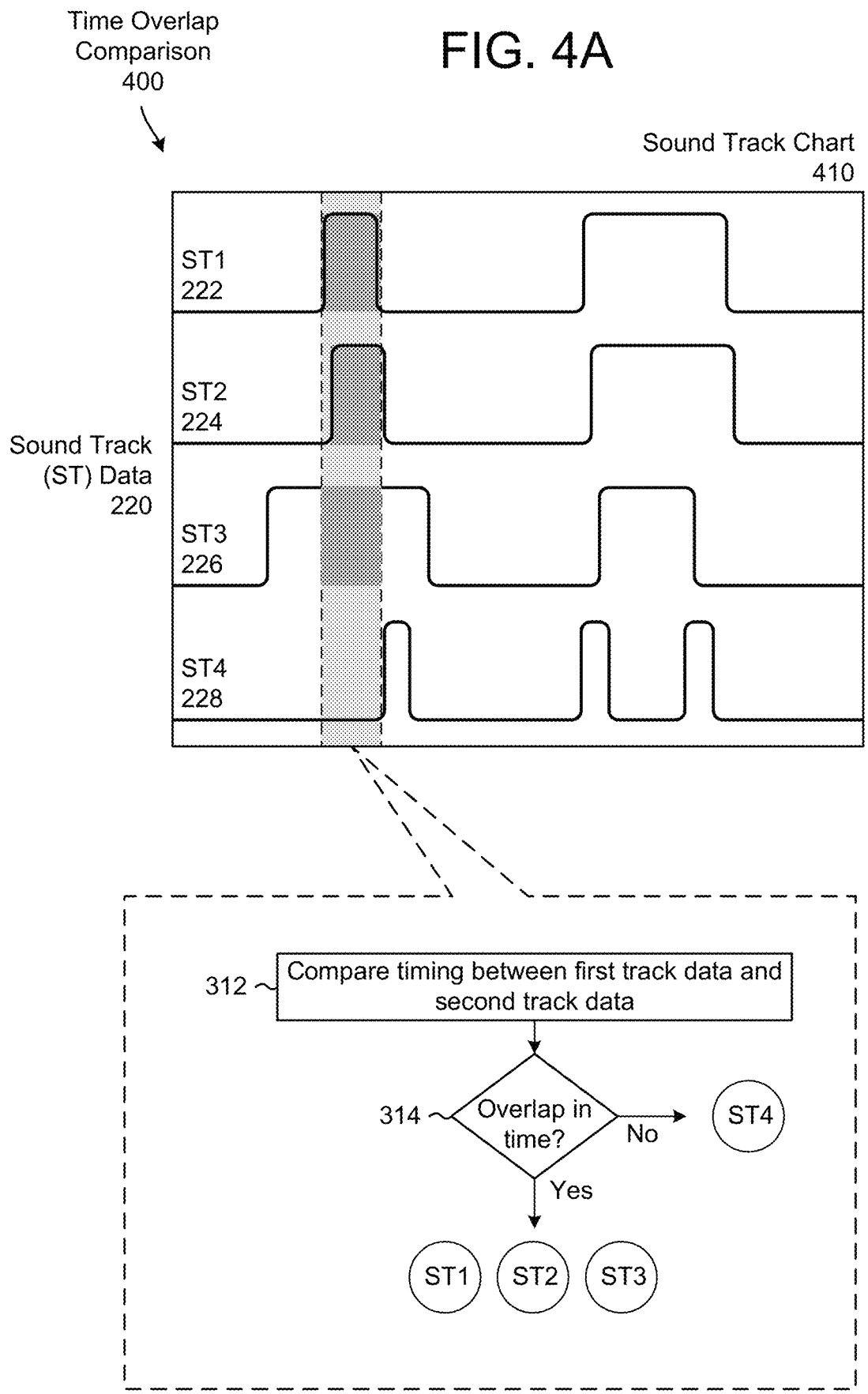

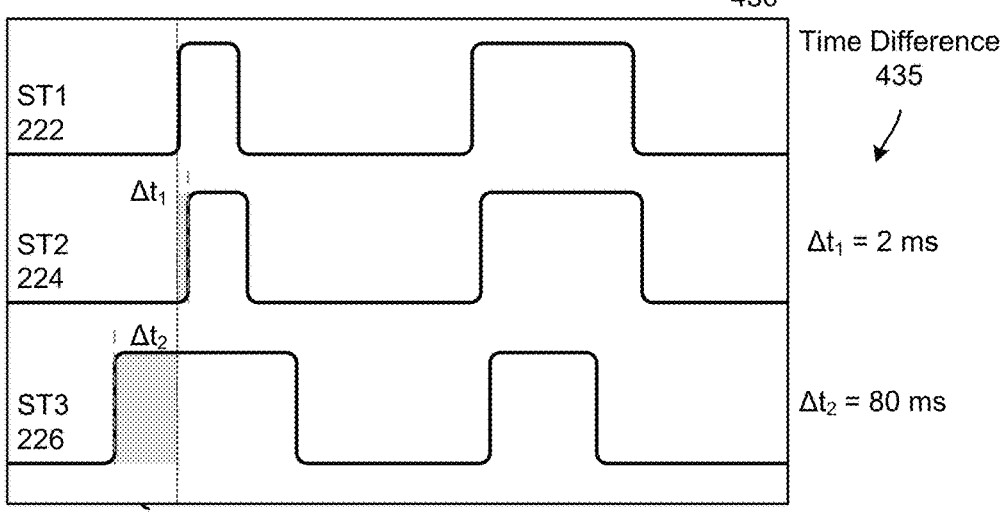
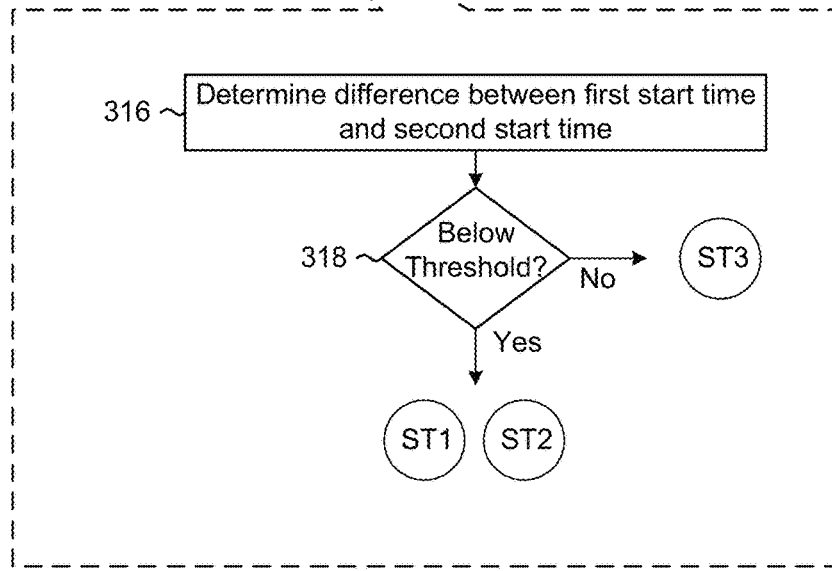
FIG. 4B

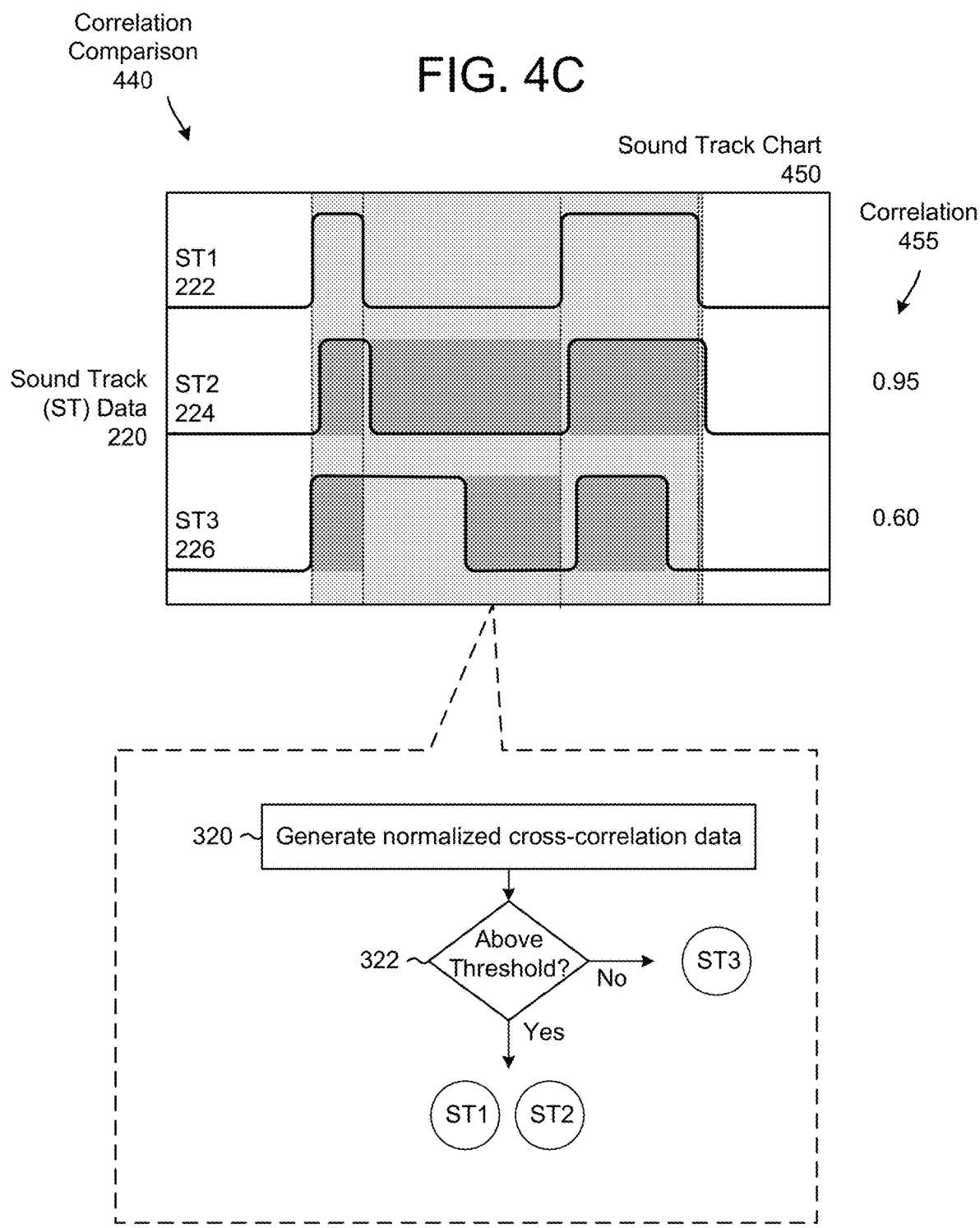

Classification Example 460
FIG. 4D
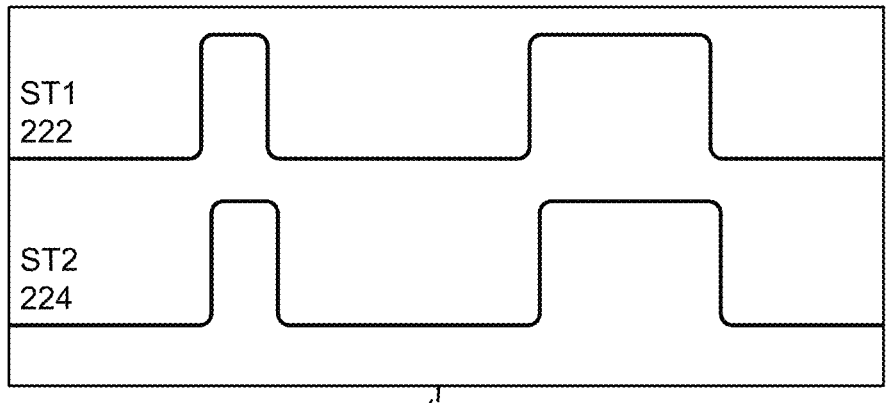
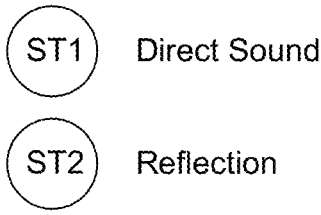
Sound Track (ST) Data 220
ST1 222
ST2 224
326 — Invoke classifier to determine classifier output data
ST1 Direct Sound
ST2 Reflection
Classification Output Data 470

FIG. 7A

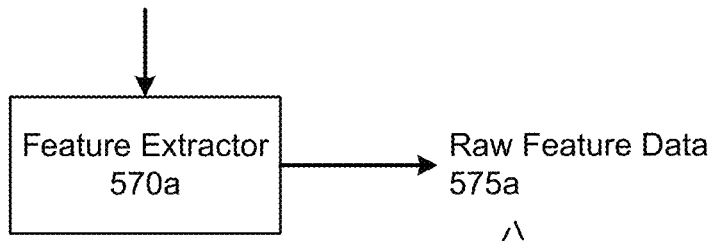

Reflection Track Data 565 → Feature Extractor 570a → Raw Feature Data 575a

Basic Features 700

- Signal-to-Noise Ratio (SNR) values
- Peak-to-Valley ratio (PVR) values
- Confidence Score values

FIG. 7B

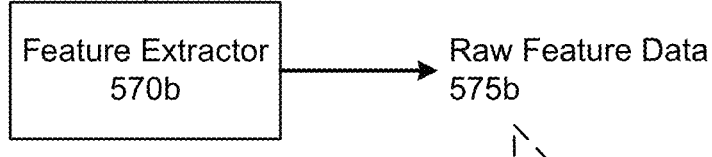

Reflection Track Data 565 → Feature Extractor 570b → Raw Feature Data 575b

Expanded Features 720

- Signal-to-Noise Ratio (SNR) values
- Peak-to-Valley Ratio (PVR) values
- Confidence Score values
- Peak Cross-Correlation value
- Position of Peak Cross-Correlation value
- Cross-Correlation values
- Relative Power Ratio values
- Power Comparison values
- Normalized Initial Power Difference value
- Normalized Power Mean Difference value
- <Other Power Sequence Features>
- <Direction Sequence Features>

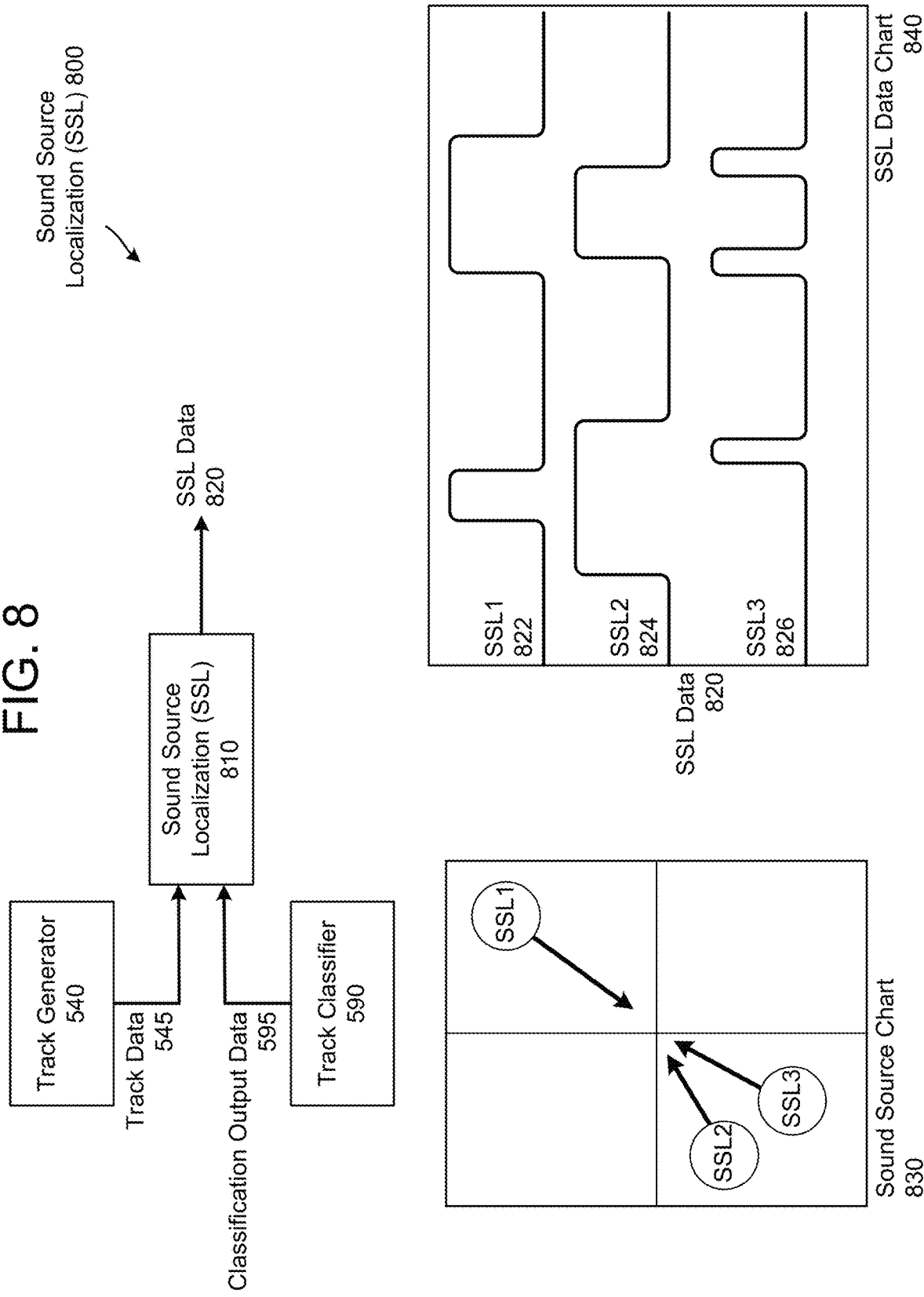

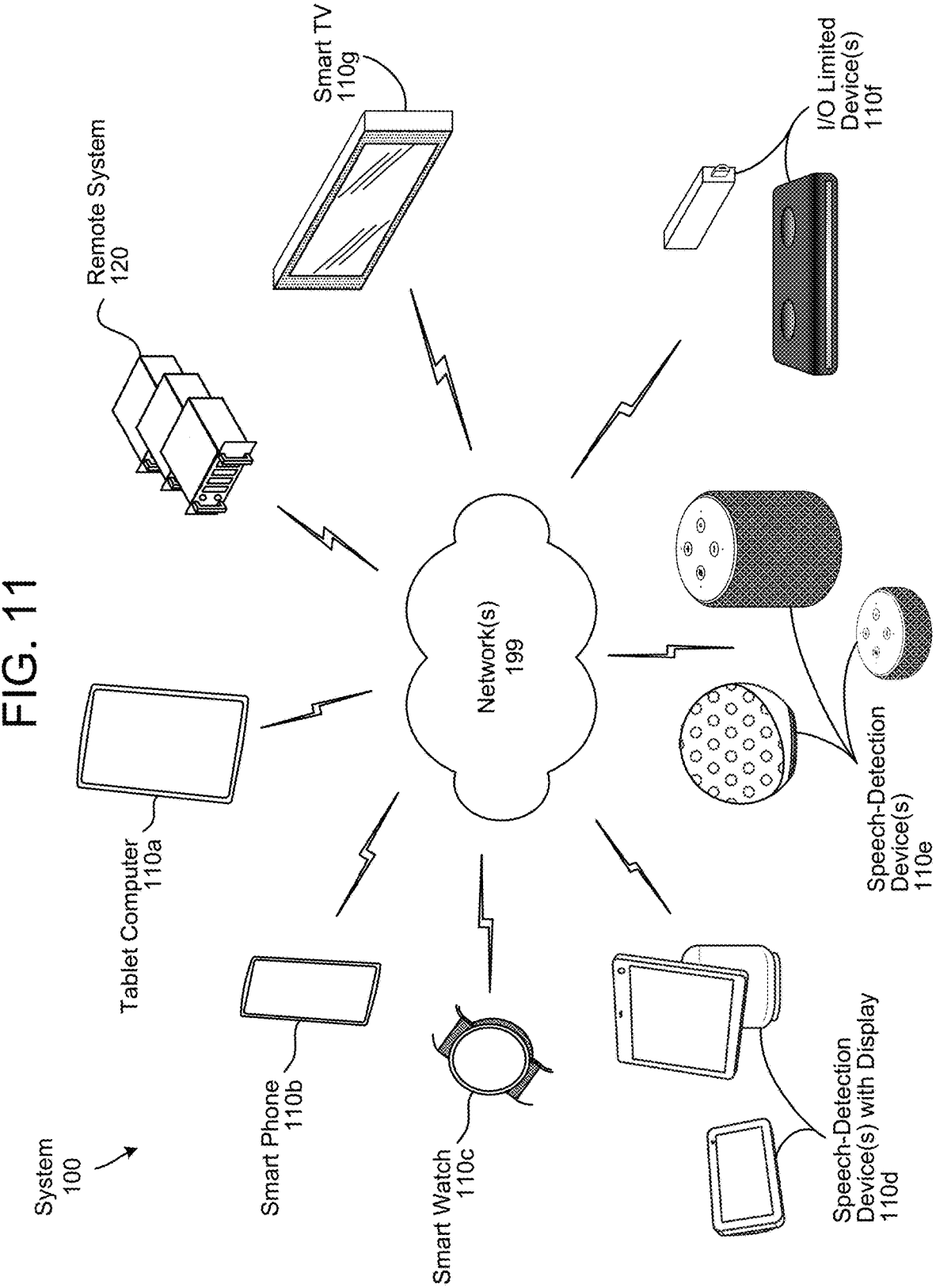

SOUND SOURCE LOCALIZATION USING REFLECTION CLASSIFICATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system configured to perform reflection classification according to embodiments of the present disclosure.

FIGS. 2A-2B illustrate an example of generating sound track data according to examples of the present disclosure.

FIGS. 4A-4D illustrate examples of performing reflection classification according to examples of the present disclosure.

FIGS. 7A-7B illustrate example component diagrams for performing feature extraction according to examples of the present disclosure.

FIG. 8 illustrates an example component diagram for performing sound source localization according to examples of the present disclosure.

FIG. 11 illustrates an example of a computer network for use with the overall system according to embodiments of the present disclosure.

DETAILED DESCRIPTION

Figure 2B:
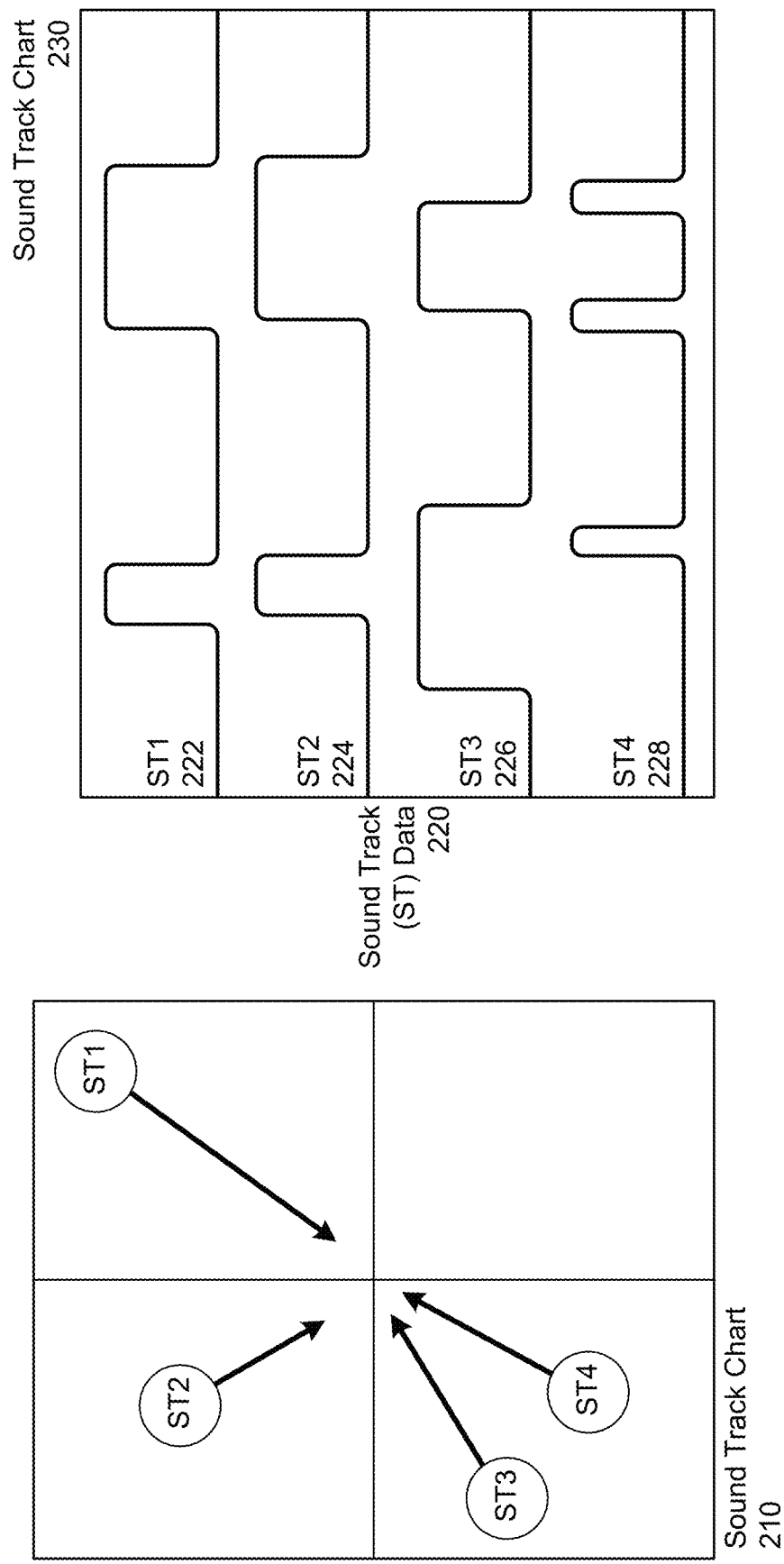

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization to distinguish between multiple sound sources represented in the audio data. However, while the sound source localization separates the audio data based on the sound source, the device cannot tell which sound source is associated with the desired speech. In addition, the sound source localization may not distinguish between a direct sound source and a reflected sound source that corresponds to reflections caused by acoustically reflective surfaces in proximity to the device.

To improve a user experience and an accuracy of sound source localization, devices, systems and methods are disclosed that perform reflection classification to distinguish between direct sound sources and reflections of sound sources. For example, the system generates sound track data that includes an individual sound track for each sound source present in an environment. To detect reflections, the system determines whether a pair of sound tracks are strongly correlated. For example, the system may calculate a correlation value for each pairwise combination of the sound tracks and determine whether the correlation value exceeds a threshold value. When the system detects that a pair of sound tracks have a correlation value above a threshold value, the system may invoke a reflection classifier trained to distinguish between direct sound sources and reflected sound sources. To perform reflection classification, the system may extract feature data from the pair of sound tracks and process the feature data using a trained model. Based on the output of the reflection classifier, the system associates one of the sound tracks with the direct sound source and assigns the other sound track as a reflection of the sound source, indicating that the reflected sound track may be ignored during sound source localization processing.

FIG. 1 illustrates a high-level conceptual block diagram of a system 100 configured to perform reflection classification according to examples of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that is configured to perform sound source localization (SSL) using reflection classification.

The device 110 may be an electronic device configured to capture and/or receive audio data. For example, the device 110 may include a microphone array configured to generate audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

As illustrated in FIG. 1, an environment 20 of the device 110 may include three separate sound sources, although the disclosure is not limited thereto. For example, FIG. 1 illustrates that the environment 20 may include a first user 5a at a first location (e.g., first direction relative to the device 110), a second user 5b at a second location (e.g., second direction relative to the device 110), and a third user 5c at a third location (e.g., third direction relative to the device 110). In addition, the environment 22 includes an acoustically reflective surface 22 that reflects sound waves generated by the first user 5a. Thus, the device 110 may detect a fourth sound source at a fourth location (e.g., fourth direction relative to the device 110). At various times, each of the sound sources may generate audible noises that may be represented in the input audio data generated by the device 110.

To improve a user experience and correctly interpret voice commands received from the first user 5a, the device 110 may be configured to perform reflection classification to determine that the fourth sound source is actually a reflection of the first sound source and therefore ignore the fourth sound source. For example, the device 110 may determine that the fourth sound source is strongly correlated to the first sound source and may invoke a reflection classifier that is trained to distinguish between a direct sound source and a reflected sound source. Thus, the reflection classifier may generate classifier output data indicating that the first sound source corresponds to direct sound waves and the device 110 may assign the fourth sound source as a reflection.

To perform sound source localization using reflection classification, the device 110 may receive (130) audio data originating from a microphone array and may generate (132) track data using the audio data. For example, track data may describe acoustic activities by generating a sound track associated with an individual sound source. The sound track may include a start time, end time, power value, and/or direction for one or more audible sounds, although the disclosure is not limited thereto. For example, the sound track may include a power sequence as a function of time, with one power value per frame. The track data may include a sound track for each of the sound sources included in the environment 20. In the example illustrated in FIG. 1, for example, the track data may include four separate sound tracks corresponding to the users 5a-5c and the reflection generated by the acoustically reflective surface 22.

The device 110 may identify (134) two correlated sound tracks represented in the track data. For example, the device 110 may compare each pairwise combination of the four sound tracks to determine that the first sound track associated with the first user 5a is strongly correlated to a second sound track associated with the acoustically reflective surface 22. The device 110 may determine that the sound tracks are strongly correlated by determining that they an overlap in time, determining a difference in start times, calculating a normalized cross-correlation, and/or the like, as described in greater detail below with regard to FIG. 3.

After determining that two sound tracks are correlated, the device 110 may extract (136) feature data corresponding to the first sound track and the second sound track. For example, the device 110 may extract features such as signal-to-noise ratio (SNR) values, peak-to-valley ratio (PVR) values, confidence score values, and/or the like, as described in greater detail below with regard to FIGS. 7A-7B.

Using the feature data extracted in step 136, the device 110 may perform (138) reflection classification to determine that the first sound track is a direct sound source. For example, the device 110 may determine that the first sound track corresponds to direct sound waves (e.g., direct arrival) representing first audible sounds generated by the first user 5a, whereas the second sound track corresponds to reflected sound waves (e.g., reflection) that represent the first audible sounds but were reflected by the acoustically reflective surface 22. As described in greater detail below with regard to FIG. 5B, the device 110 may perform reflection classification by invoking a reflection classifier (e.g., trained model) that is configured to distinguish between direct sound waves and reflected sound waves.

After determining that the first sound track corresponds to the direct sound source, the device 110 may assign (140) the second sound track as a reflection in the track data. Thus, the track data may continue to include and update the second sound track, but the track data indicates that the second sound track is a reflection of the first sound track and does not correspond to a separate sound source.

Using the track data, the device 110 may generate (142) sound source localization (SSL) data corresponding to the audio data. To illustrate an example, the device 110 may be configured to perform SSL processing to generate SSL data corresponding to multiple sound sources. For example, the device 110 may determine that the first sound source is associated with a first location (e.g., first direction relative to the device 110) and the SSL data may indicate when an audible sound corresponding to the first location is represented in the input audio data. Thus, the SSL data may distinguish between multiple sound sources based on Time of Arrival (TOA) processing, Delay of Arrival (DOA) processing, and/or the like, enabling the device 110 to track the sound sources over time.

While not illustrated in FIG. 1, the device 110 may use the SSL data to process a voice command. For example, the device 110 may generate input audio data representing a voice command, may detect a wakeword represented in the input audio data, may identify a sound source associated with the wakeword, and may use the SSL data to generate output audio data that corresponds to the selected sound source and represents the voice command. Thus, the device 110 may isolate a portion of the input audio data corresponding to the first sound source and may cause the portion of the audio data to be processed to determine a voice command.

In some examples, the device 110 may be configured to perform natural language processing to determine the voice command and may perform an action corresponding to the voice command. However, the disclosure is not limited thereto and in other examples the device 110 may be configured to send the portion of the audio data to a natural language processing system to determine the voice command without departing from the disclosure.

The audio data may be generated by a microphone array of the device 110 and therefore may correspond to multiple channels. For example, if the microphone array includes eight individual microphones, the audio data may include eight individual channels. To improve audio processing of subsequent components, such as a wakeword engine component configured to detect the wakeword, in some examples the device 110 may process the multi-channel audio data to generate a single channel output.

The device 110 may perform sound source localization processing to separate the audio data based on sound source and indicate when an individual sound source is represented in the audio data. To illustrate an example, the device 110 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. Thus, the SSL data may include a first portion or first SSL data indicating when the first sound source is detected, a second portion or second SSL data indicating when the second sound source is detected, and so on.

The device 110 may use Time of Arrival (TOA) processing, Delay of Arrival (DOA) processing, and/or the like to determine the SSL data, although the disclosure is not limited thereto. In some examples, the SSL data may include multiple SSL tracks (e.g., individual SSL track for each unique sound source represented in the audio data), along with additional information for each of the individual SSL tracks. For example, for a first SSL track corresponding to a first sound source (e.g., audio source), the SSL data may indicate a position and/or direction associated with the first sound source location, a signal quality metric (e.g., power value) associated with the first SSL track, and/or the like, although the disclosure is not limited thereto.

The device 110 may be configured to track a sound source over time, collecting information about the sound source and maintaining a position of the sound source relative to the device 110. Thus, the device 110 may track the sound source even as the device 110 and/or the sound source move relative to each other. In some examples, the device 110 may determine position data including a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

FIGS. 2A-2B illustrate an example of generating sound track data according to examples of the present disclosure. As shown in the sound track example 200 illustrated in FIG. 2A, in some examples the environment 20 may include three sound sources, such as a first user 5a, a second user 5b, and a third user 5c, although the disclosure is not limited thereto. The three sound sources may generate audible sounds (e.g., audible noises) and the device 110 may be configured to capture these audible sounds by generating audio data that includes representations of the audible sounds. However, in addition to capturing direct sound waves corresponding to the audible sounds, the audio data may also include representations of reflected sound waves that reflect off of acoustically reflective surfaces in the environment.

FIG. 2A illustrates an example in which the device 110 is located in proximity to an acoustically reflective surface 22 (e.g., a wall), such that first audible sound(s) generated by the first user 5a may reflect off of the acoustically reflective surface 22 and the device 110 may capture reflection(s) of the first audible sound(s). Thus, the audio data includes a first representation of the first audible sound(s) associated with a first direction (e.g., first user 5a) along with a second representation of the first audible sound(s) associated with a second direction (e.g., acoustically reflective surface 22).

The device 110 may process the audio data to identify unique sound sources and determine a direction corresponding to each of the sound sources. For example, the device 110 may identify a first sound source in the first direction (e.g., first user 5a), a second sound source in the second direction (e.g., reflection associated with the acoustically reflective surface 22), a third sound source in a third direction (e.g., third user 5c), and a fourth sound source in a fourth direction (e.g., second user 5b), as illustrated in sound track chart 210. In some examples, the device 110 may determine the directions associated with each of the sound sources and represent these directions as a value in degrees (e.g., between 0-360 degrees) relative to a position of the device 110, although the disclosure is not limited thereto.

As illustrated in FIG. 2A, the environment 20 described above with regard to FIG. 1 is represented by sound track chart 210, which depicts four different sound source locations relative to the device 110. Thus, the device 110 may generate sound track (ST) data 220 that distinguishes between individual sound sources in the environment 20 and represents each of the sound sources based on a corresponding location. For example, the device 110 may identify a first sound source corresponding to the first user 5a and generate first sound track data ST1 222 (e.g., a first portion of the ST data 220) corresponding to first speech generated by the first user 5a, identify a second sound source corresponding to the acoustically reflective surface reflecting the first speech and generate second sound track data ST2 224 (e.g., a second portion of the ST data 220), identify a third sound source corresponding to the third user 5c and generate third sound track data ST3 226 (e.g., a third portion of the ST data 220) corresponding to second speech generated by the third user 5c, and identify a fourth sound source corresponding to the second user 5b and generate fourth sound track data ST4 228 (e.g., a fourth portion of the ST data 220) corresponding to third speech generated by the second user 5b.

As part of identifying unique sound sources, the device 110 may generate sound track data representing sound tracks. For example, the sound track data may include an individual sound track for each sound source, enabling the device 110 to track multiple sound sources simultaneously. The sound track data may represent a sound track using a power sequence as a function of time, with one power value per frame. The power sequence may include one or more peaks, with each peak (e.g., pulse) corresponding to an audible sound.

As described in greater detail below, the device 110 may detect an audible sound by identifying a short power sequence corresponding to a peak and may attempt to match the short power sequence to an already established sound track. For example, the device 110 may compare the short power sequence and a corresponding direction (e.g., direction of arrival associated with the audible sound) to existing sound tracks and match the short power sequence to an already established sound track, if appropriate. Thus, an individual sound track may include multiple audible sounds associated with a single sound source, even as a direction of the sound source changes relative to the device 110. The sound track may describe acoustic activities and have a start time, end time, power, and direction. In some examples, each audible sound (e.g., peak) included in the sound track may be associated with a start time, end time, power, and/or direction corresponding to the audible sound, although the disclosure is not limited thereto.

As shown in the sound track chart 210 illustrated in FIG. 2A, the device 110 may process the audio data to identify unique sound sources and may generate sound track data 220 corresponding to the sound sources. For example, the device 110 may generate a first sound track (e.g., ST1) corresponding to the first sound source in the first direction (e.g., first user 5a), generate a second sound track (e.g., ST2) corresponding to the second sound source in the second direction (e.g., reflection associated with the acoustically reflective surface 22), generate a third sound track (e.g., ST3) corresponding to the third sound source in the third direction (e.g., third user 5c), and generate a fourth sound track (e.g., ST4) corresponding to the fourth sound source in the fourth direction (e.g., second user 5b).

As illustrated in FIG. 2B, the sound track (ST) data 220 may include four individual sound tracks corresponding to the four sound sources detected by the device 110. For ease of illustration, the sound track chart 230 illustrates audible sounds represented in the sound track data 220 using pulses having a uniform magnitude regardless of the individual audible sound or sound track. However, this is intended to conceptually illustrate a simple example and the disclosure is not limited thereto. Instead, the sound track data 220 may correspond to four power sequences having different power values that vary over time without departing from the disclosure.

As illustrated in the sound track chart 230, a first binary value (e.g., 0) indicates that a signal is not represented in the audio data, while a second binary value (e.g., 1) indicates that the signal is represented in the audio data. Thus, the first sound track ST1 222 may include a short pulse and a long pulse, which corresponds to the first user 5a speaking twice (e.g., for a short length of time during a first time range and then for a longer length of time during a second time range). As the second sound track ST2 224 is a reflection of the first sound track ST1 222, the second sound track ST2 224 may also include a short pulse and a long pulse corresponding to the first user 5a speaking twice. Similarly, the third sound track ST3 226 includes a long pulse and a medium pulse, which corresponds to the third user 5c speaking twice (e.g., for a longer length of time during the first time range and then for a medium length of time during the second time range). In contrast, the fourth sound track ST4 228 includes three short pulses, which corresponds to the second user 5b speaking three times (e.g., twice during the first time range and once during the second time range).

As illustrated in the sound track chart 230, some of the sounds may overlap in time. For example, the first user 5a and the third user 5c speak at the same time during the first time range, while the first user 5a, the second user 5b, and the third user 5c speak at the same time during the second time range. As both the first sound track ST1 222 and the second sound track ST2 224 correspond to the first sound source, a first power sequence of the first sound track ST1 222 is similar to a second power sequence of the second sound track ST2 224. Thus, both the first sound track ST1 222 and the second sound track ST2 224 represent a first audible sound (e.g., short pulse) and a second audible sound (e.g., long pulse). In contrast, the third sound track ST3 226 correspond to the third sound source and is therefore different from the first sound track ST1 222 and the second sound track ST2 224. For example, the third sound track ST3 226 represents a third audible sound (e.g., long pulse) followed by a fourth audible sound (e.g., medium pulse) that overlap the first audible sound and the second audible sound, respectively. Finally, the fourth sound track ST4 228 corresponds to the fourth sound source and represents a series of audible sounds (e.g., three short pulses).

In order to improve a user experience and correctly respond to input commands from the first user 5a, the device 110 may determine that the first sound track ST 222 and the second sound track ST2 224 are extremely similar, indicating that they may represent audible sounds generated by a single sound source. Thus, the device 110 may determine that these two sound tracks correspond to a direct sound source and a reflected sound source and may perform reflection classification to determine which sound track corresponds to the direct sound waves (e.g., first user 5a) and which sound track corresponds to the reflected sound waves (e.g., acoustically reflective surface 22).

Figure 3:
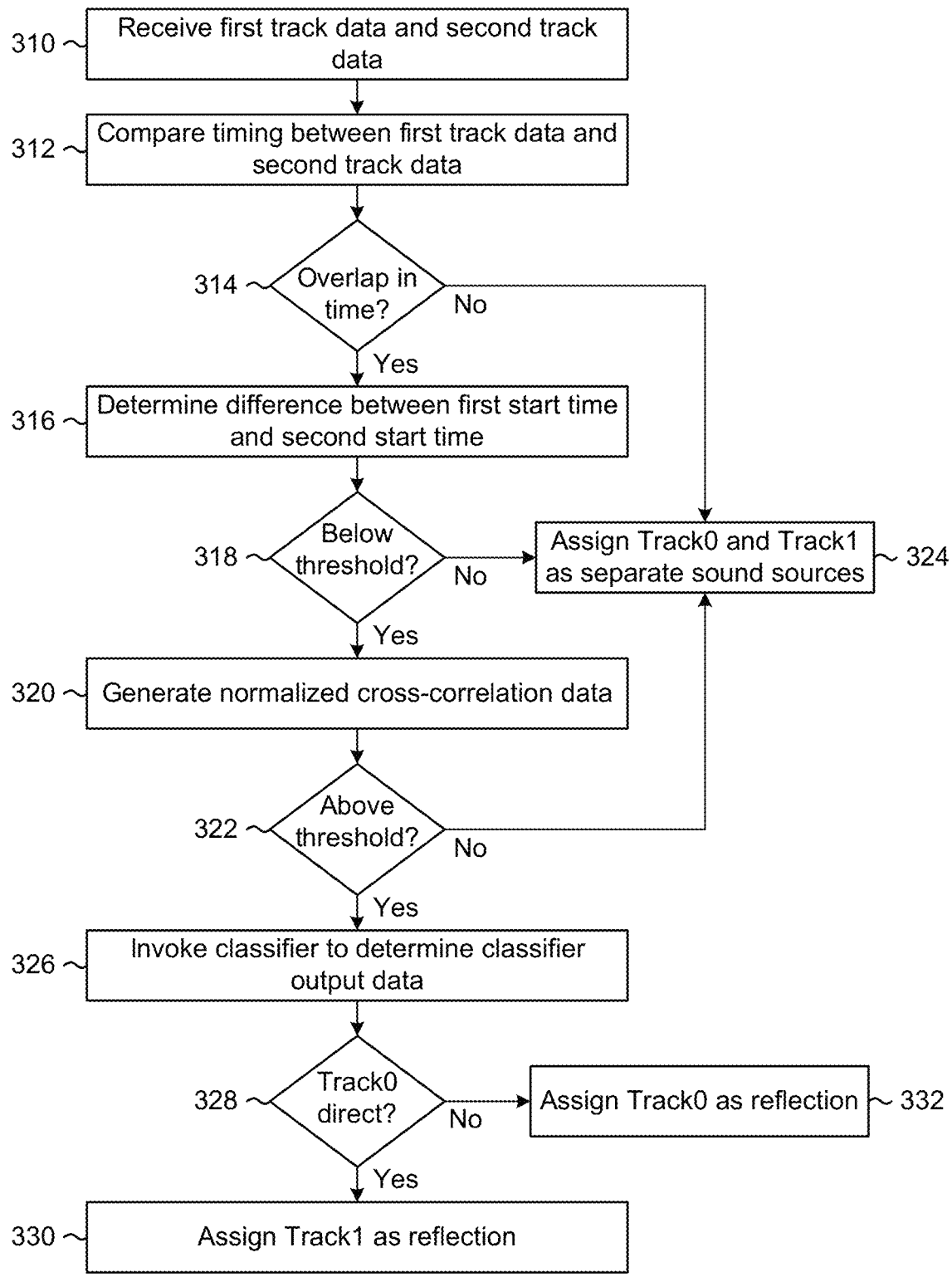
FIG. 3 is a flowchart illustrates a conceptual method for performing reflection classification according to embodiments of the present disclosure.

FIG. 3 is a flowchart illustrates a conceptual method for performing reflection classification according to embodiments of the present disclosure. As illustrated in FIG. 3, the device 110 may receive (310) first track data (e.g., Track0) and second track data (e.g., Track1) and may compare (312) a timing between the first track data and the second track data. For example, the first track data may correspond to the first sound track ST1 222 and the second track data may correspond to the second sound track ST2 224, although the disclosure is not limited thereto and the first track data and the second track data may correspond to any pair of sound tracks included in the sound track data.

For ease of illustration, FIG. 3 illustrates the device 110 performing a single sound track comparison (e.g., comparing the first track data to the second track data). However, the disclosure is not limited thereto and the device 110 may perform a comparison for each pairwise combination of sound tracks included in the sound track data 220 without departing from the disclosure. For example, the device 110 may compare a first timing between the first sound track ST1 222 and the second sound track ST2 224, a second timing between the first sound track ST1 222 and the third sound track ST3 226, a third timing between the first sound track ST1 222 and the fourth sound track ST4 228, a fourth timing between the second sound track ST2 224 and the third sound track ST3 226, a fifth timing between the second sound track ST2 224 and the fourth sound track ST4 228, and/or a sixth timing between the third sound track ST3 226 and the fourth sound track ST4 228 without departing from the disclosure. Thus, the device 110 may determine whether any two sound tracks represented in the sound track data 220 overlap in time without departing from the disclosure.

While FIG. 3 illustrates the device 110 receiving the first track data and the second track data, this is intended to conceptually illustrate a simple example and the disclosure is not limited thereto. In some examples, the device 110 may receive track data that includes a first portion corresponding to the first sound track and a second portion corresponding to the second sound track, such that the device 110 compares a timing between the first portion and the second portion without departing from the disclosure. Additionally or alternatively, while FIG. 3 illustrates the device 110 receiving the first track data and the second track data, this is for ease of illustration and the disclosure is not limited thereto. Instead, the device 110 may determine the first track data and the second track data without departing from the disclosure.

As described above, in step 312 the device 110 may compare the timing between the first track data and the second track data and may determine (314) whether the first track data and the second track data overlap in time. As the first track data and the second track data may correspond to power sequences that extend over a long period of time, determining whether the first track data and the second track data overlap in time may correspond to determining whether individual audible sounds represented in the track data overlap in time.

In some examples, the device 110 may detect a first peak (e.g., first pulse corresponding to a first audible sound) represented in the first track data and may determine whether the first peak overlaps with a second peak represented in the second track data. For example, the device 110 may determine that a first peak represented in the first sound track ST1 222 overlaps with a first peak in the second sound track ST2 224 when both sound tracks have positive power values. Similarly, the device 110 may determine that a second peak represented in the first sound track ST1 222 overlaps with a second peak in the second sound track ST2 224. Additionally or alternatively, the device 110 may determine that the first peak represented in the first sound track ST1 222 overlaps with a first peak in the third sound track ST3 226 and/or that the second peak represented in the first sound track ST1 222 overlaps with a second peak in the third sound track ST3 226 without departing from the disclosure.

If the first track data and the second track data overlap in time, the device 110 may determine (316) a difference between a first start time associated with the first track data and a second start time associated with the second track data. For example, the device 110 may determine the first start time based on a beginning of the first peak in the first sound track ST1 222, may determine the second start time based on a beginning of the first peak in the second sound track ST2 224, and may determine a first time delay corresponding to the difference between the first start time and the second start time. Similarly, the device 110 may determine the first start time based on a beginning of the second peak in the first sound track ST1 222, may determine the second start time based on a beginning of the second peak in the second sound track ST2 224, and may determine a second time delay corresponding to the difference between the first start time and the second start time, although the disclosure is not limited thereto.

After determining the difference (e.g., time difference, time delay, etc.), the device 110 may determine (318) whether the difference is below a first threshold value. A shorter time delay (e.g., smaller difference value) indicates that the audible sounds represented in the first track data and the second track data were received close together in time, increasing a likelihood that either the first track data or the second track data may be a reflection of the other track. For example, when the difference is below the first threshold value, the device 110 may determine that the first track data and the second track data represent audible sounds captured at roughly the same time, and therefore that both sound tracks may correspond to a single audible sound generated by a single sound source. If both sound tracks represent a single audible sound, then one of the sound tracks corresponds to direct sound waves received from the sound source and the other sound track corresponds to reflected sound waves reflected by the acoustically reflective surface 22.

To determine whether to perform reflection classification, the device 110 may generate (320) normalized cross-correlation data corresponding to a normalized cross-correlation between the first track data and the second track data. For example, the device 110 may determine a normalized cross-correlation between a first power sequence represented in the first track data and a second power sequence represented in the second track data during a particular search window (e.g., selected time range or period of time).

To illustrate a first example, the device 110 may determine a first normalized cross-correlation based on a first power sequence corresponding to the first peak represented in the first sound track ST1 222 and a second power sequence corresponding to the first peak represented in the second sound track ST2 224. For example, the device 110 may calculate first correlation data that includes a first correlation value (e.g., ranging from 0.0 to 1.0), which indicates a similarity between the first power sequence and the second power sequence. Similarly, the device 110 may determine a second normalized cross-correlation based on the first power sequence and a third power sequence corresponding to the first peak represented in the third sound track ST3 226. For example, the device 110 may calculate second correlation data that includes a second correlation value (e.g., ranging from 0.0 to 1.0), which indicates a similarity between the first power sequence and the third power sequence. Thus, the device 110 may determine the normalized cross-correlation for individual peaks (e.g., individual audible sounds) represented in the track data without departing from the disclosure. However, the disclosure is not limited thereto, and the device 110 may determine the normalized cross-correlation data using other techniques without departing from the disclosure.

In some examples, the device 110 may determine the normalized cross-correlation for multiple peaks corresponding to multiple audible sounds represented in the track data without departing from the disclosure. To illustrate a second example, the device 110 may determine a third normalized cross-correlation based on a fourth power sequence that includes both the first peak and the second peak represented in the first sound track ST1 222 (e.g., the search window corresponds to a portion of the first sound track ST1 222 that includes both peaks) and a fifth power sequence that includes both the first peak and the second peak represented in the second sound track ST2 224 (e.g., the search window corresponds to a portion of the second sound track ST2 224 that includes both peaks). For example, the device 110 may calculate third correlation data that includes a third correlation value (e.g., ranging from 0.0 to 1.0), which indicates a similarity between the fourth power sequence and the fifth power sequence. Similarly, the device 110 may determine a fourth normalized cross-correlation based on the fourth power sequence and a sixth power sequence that includes both the first peak and the second peak represented in the third sound track ST3 226 (e.g., the search window corresponds to a portion of the third sound track ST3 226 including both peaks). For example, the device 110 may calculate fourth correlation data that includes a fourth correlation value (e.g., ranging from 0.0 to 1.0), which indicates a similarity between the fourth power sequence and the sixth power sequence. However, the disclosure is not limited thereto, and the device 110 may determine the normalized cross-correlation data using other techniques without departing from the disclosure.

After determining the normalized cross-correlation data, the device 110 may determine (322) whether the correlation value represented in the normalized cross-correlation data is above a second threshold value. A larger correlation value (e.g., stronger correlation) indicates that the audible sounds represented in the first track data and the second track data are more similar, increasing a likelihood that either the first track data or the second track data may be a reflection of the other track. For example, when the correlation value is above the second threshold value (e.g., 0.7, although the disclosure is not limited thereto), the device 110 may determine that the first track data and the second track data correspond to audible sound(s) generated by a single sound source. Thus, the device 110 may invoke the reflection classifier to determine which sound track corresponds to direct sound waves received from the sound source and which sound track corresponds to reflected sound waves reflected by the acoustically reflective surface 22. In contrast, when the correlation value is below the second threshold value, the device 110 may determine that the first track data and the second track data represent separate audible sounds generated by two sound sources.

As illustrated in FIG. 3, if the device 110 determines that the first track data (e.g., Track0) and the second track data (e.g., Track1) do not overlap in time in step 314, that the difference is above the first threshold value in step 318, or that the cross-correlation value is below the second threshold value in step 322, the device 110 may assign (324) the first track data (e.g., Track0) and the second track data (e.g., Track1) as separate sound sources. For example, the device 110 may determine that the first track data corresponds to a first sound source and that the second track data corresponds to a second sound source that is different than the first sound source.

In contrast, if the device 110 determines that the first track data (e.g., Track0) and the second track data (e.g., Track1) overlap in time in step 314, that the difference is below the first threshold value in step 318, and that the cross-correlation value is above the second threshold value in step 322, the device 110 determines that the first track data and the second track data correspond to audible sound(s) generated by a single sound source. Therefore, the device 110 may invoke (326) the reflection classifier to generate classifier output data and determine which sound track corresponds to direct sound waves received from the sound source and which sound track corresponds to reflected sound waves reflected by the acoustically reflective surface 22. For example, the reflection classifier may process feature data associated with the first track data and/or the second track data and may generate classifier output data indicating which track represents a reflection. In some examples, the classifier output data may indicate a first value (e.g., value of 1) when the second track data corresponds to a reflection (e.g., Track1 is a reflection of Track0) or a second value (e.g., value of −1 or 0) when the first track data corresponds to a reflection (e.g., Track0 is a reflection of Track1), although the disclosure is not limited thereto.

Based on the classifier output data, the device 110 may determine (328) whether the first track data corresponds to direct sound waves (e.g., Track0 is a direct sound source). If the first track data corresponds to the direct sound waves, the device 110 may assign (330) the second track data as a reflection (e.g., Track1 is a reflected sound source) and may associate the first sound source with the first track data. However, if the first track data corresponds to the reflected sound waves, the device 110 may assign (332) the first track data as a reflection (e.g., Track0 is a reflected sound source) and may associate the first sound source with the second track data (e.g., Track1 is a direct sound source).

As described above, the device 110 may generate track data that includes a track representing acoustical activity associated with an individual sound source. For example, the track data may include a first track representing first acoustical activity associated with a first sound source and a second track representing second acoustical activity associated with a second sound source. When the device 110 assigns a selected track as a reflection (e.g., reflected sound source), the track data indicates that the selected track represents acoustical activity associated with a reflected sound source and indicates the relationship between the reflected sound source and the direct sound source. For example, when the device 110 assigns the second track as a reflection of the first track, the track data indicates a first direction associated with the first track, a second direction associated with the second track, that the first track corresponds to a first sound source, and that the second track corresponds to a reflection of the first sound source. Similarly, when the device 110 assigns the first track as a reflection of the second track, the track data indicates a first direction associated with the first track, a second direction associated with the second track, that the second track corresponds to a first sound source, and that the first track corresponds to a reflection of the first sound source. Thus, the device 110 may use the track data to monitor acoustic activities in order to update existing tracks and generate new tracks.

FIGS. 4A-4D illustrate examples of performing reflection classification according to examples of the present disclosure. For example, each of the determination steps illustrated in FIG. 3 are illustrated in FIGS. 4A-4D. However, FIGS. 4A-4D are intended to conceptually illustrate a simple example and the disclosure is not limited thereto. Thus, the device 110 may perform reflection classification using other techniques without departing from the disclosure, as described in greater detail below with regard to FIGS. 6A-6B.

FIG. 4A illustrates an example of the device 110 performing a time overlap comparison 400 using the sound track data 220. As described above with regard to FIG. 3, the device 110 may compare (312) a timing between the first track data and the second track data and may determine (314) whether there is an overlap in time between the first track data and the second track data. In the time overlap comparison 400 illustrated in FIG. 4A, the device 110 may compare the first sound track to each of the remaining sound tracks represented in the sound track data 220. For example, the device 110 may identify a first peak represented in the first sound track ST1 222 and may determine whether there is a corresponding peak in the second sound track ST2 224, the third sound track ST3 226, and/or the fourth sound track ST4 228.

If there is a corresponding peak, this indicates that a first audible sound represented by the first peak in the first sound track ST1 222 overlaps in time with a second audible sound represented by the corresponding peak. As illustrated in the time overlap comparison 400, the first sound track ST1 222 overlaps in time with the second sound track ST2 224 and the third sound track ST3 226, but not the fourth sound track ST4 228. For example, the sound track chart 410 illustrates that within a search window corresponding to the first peak represented in the first sound track ST1 222, the second sound track ST2 224 and the third sound track ST3 226 both include a corresponding peak (e.g., high value), whereas the fourth sound track ST4 228 does not include a peak (e.g. low value). Thus, the device 110 may determine that the fourth sound track ST4 228 does not overlap in time with the first sound track ST1 222.

While FIG. 4A illustrates a simplified example in which values of the sound track data 220 are represented using either a high value or a low value, the disclosure is not limited thereto and the values of the sound track data 220 may correspond to power values that vary over time without departing from the disclosure. In some examples, the device 110 may determine when the power values exceed a threshold value, which corresponds to the high value represented in the sound track chart 410. Thus, the low value represented in the sound track chart 410 may correspond to when the power values are lower than the threshold value.

While the first sound track ST1 222, the second sound track ST2 224, and the third sound track ST3 226 overlap in time, the sound track chart 410 illustrates that the third sound track ST3 226 includes a peak that lasts longer than the first peak represented in the first sound track ST1 222. Thus, a third audible sound represented by the peak included in the third sound track ST3 226 is unlikely to correspond to the first audible sound represented by the first peak included in the first sound track ST1 222. To distinguish between sounds tracks that represent different audible sounds, the device 110 may compare a start time for each of the peaks included in the sound tracks.

FIG. 4B illustrates an example of the device 110 performing start time comparison 420 using the sound track data 220. As described above with regard to FIG. 3, the device 110 may determine (316) a difference between a first start time associated with the first sound track data and a second start time associated with the second track data and may determine (318) whether the difference is below a first threshold value.

In the start time comparison 420 illustrated in FIG. 4B, the device 110 may compare a first start time for the first sound track to start times for each of the remaining sound tracks represented in the sound track data 220 to determine a time difference 435. For example, the sound track chart 430 illustrates a first start time corresponding to a beginning of a first peak included in the first sound track ST1 222, a second start time corresponding to a beginning of a first peak included in the second sound track ST2 224, and a third start time corresponding to a beginning of a first peak included in the third sound track ST3 226. As illustrated in the sound track chart 430, the device 110 may determine a first time difference (e.g., $\Delta t_1=2$ ms) between the first start time and the second start time and may determine a second time difference (e.g., $\Delta t_2=80$ ms) between the first start time and the third start time.

After determining the time difference 435, the device 110 may determine whether the time difference 435 is below a first threshold value (e.g., 50 ms, although the disclosure is not limited thereto), indicating that the sound tracks started at roughly the same time. For example, the device 110 may determine that the first time difference (e.g., $\Delta t_1=2$ ms) between the first start time and the second start time is below the first threshold value, indicating that the first track and the second track started similarly. In contrast, the device 110 may determine that the second time difference (e.g., $\Delta t_2=80$ ms) is above the first threshold value, indicating that the first track and the third track did not start similarly.

As illustrated at the bottom of FIG. 4B, the device 110 may continue comparing the first sound track ST1 222 and the second sound track ST2 224 in order to determine whether to perform reflection classification. However, as the second time difference is not below the first threshold value, the device 110 may determine that the third sound track ST3 226 corresponds to a separate sound source than the first sound track ST1 222.

FIG. 4C illustrates an example of the device 110 performing correlation comparison 440 using the sound track data 220. To illustrate examples of distinguishing between similar sound tracks having a first correlation value above a second threshold value and dissimilar sound tracks having a second correlation value below the second threshold value, the third sound track ST3 226 is illustrated differently than shown in the previous drawings. For example, FIG. 4C illustrates a hypothetical example in which the third sound track ST3 226 is delayed so that the second time difference is below the first threshold value. Thus, the first peak included in the third sound track ST3 226 is associated with a third start time that is similar to the first start time.

After associating any sound tracks having a time difference above the first threshold value with a separate sound source, the device 110 may perform a correlation comparison 440 to determine a similarity between each pair of sound tracks remaining (e.g., pairwise combination). For example, the device 110 may determine a correlation value between two sound tracks, with the correlation value indicating a similarity between the two sound tracks. As described in greater detail above, the device 110 may generate (320) normalized cross-correlation data and may determine (322) whether a correlation value associated with the normalized cross-correlation data is above a second threshold (e.g., 0.7, although the disclosure is not limited thereto).

As illustrated in the sound track chart 450, the device 110 may determine first cross-correlation data representing a first cross-correlation between the first sound track ST1 222 and the second sound track ST2 224. For example, the device 110 may determine a first correlation value (e.g., 0.95) indicating that the first sound track ST1 222 and the second sound track ST2 224 are strongly correlated (e.g., have a strong similarity). Similarly, the device 110 may determine second cross-correlation data representing a second cross-correlation between the first sound track ST1 222 and the third sound track ST3 226. For example, the device 110 may determine a second correlation value (e.g., 0.60) indicating that the first sound track ST1 222 and the third sound track ST3 226 are weakly correlated (e.g., have a weak similarity).

The device 110 may determine the normalized cross-correlation data using multiple techniques without departing from the disclosure. To illustrate a simplified technique, the sound track chart 450 illustrates a first time window corresponding to the normalized cross-correlation highlighted using shades of gray. For each portion of the first sound track ST1 222 within the first time window, the device 110 may perform a mathematical operation to compare a first value of the portion of the first sound track ST1 222 to a second value of a corresponding portion of the second sound track ST2 224 and/or the third sound track ST3 226. For example, the device 110 may perform an "exclusive or" XOR (e.g., exclusive disjunction) operation between the first value of the first sound track ST1 222 and the second value of the second sound track ST2 224 and/or the third sound track ST3 226, although the disclosure is not limited thereto and the device 110 may perform other operations without departing from the disclosure.

As used herein, an XOR operation compares the first value to the second value to identify when they are different. For example, the XOR operation may result in a first binary value (e.g., 0) when the first value is equal to the second value (e.g., both the first value and the second value have a value of zero or a value of one) and may result in a second binary value (e.g., 1) when the first value is different than the second value (e.g., the first value is equal to zero and the second value is equal to one, or the first value is equal to one and the second value is equal to zero). This is illustrated in the XOR truth table, shown below.

TABLE 1

XOR Truth Table

| INPUT | | OUTPUT |
|---|---|---|
| A | B | |
| 0 | 0 | 0 |
| 0 | 1 | 1 |
| 1 | 0 | 1 |
| 1 | 1 | 0 |

As illustrated in FIG. 4C, the sound track chart 450 represents the first binary value (e.g., 0) using a dark shade of gray and represents the second binary value (e.g., 1) using a light shade of gray. For example, the second sound track ST2 224 is equal to the first sound track ST1 222 throughout most of the first time window, resulting in the second sound track ST2 224 being represented using the dark shade of gray throughout most of the first time window. In contrast, the third sound track ST3 226 is only equal to the first sound track ST1 222 for a smaller portion of the first time window, resulting in the third sound track ST3 226 being represented using a combination of the dark shade of gray and the light shade of gray throughout the first time window.

In the example illustrated in FIG. 4, the correlation 455 between the first sound track ST1 222 and the second sound track ST2 224 corresponds to the first correlation value (e.g., 0.95), indicating that the second sound track ST2 224 is strongly correlated with the first sound track ST1 222 during the first time window. In contrast, the correlation 455 between the first sound track ST1 222 and the third sound track ST3 226 corresponds to the second correlation value (e.g., 0.60), indicating that the third sound track ST3 226 is only weakly correlated with the first sound track ST1 222 during the first time window.

As illustrated at the bottom of FIG. 4C, as the first correlation value is above the second threshold value, the device 110 may continue comparing the first sound track ST1 222 and the second sound track ST2 224 in order to determine whether to perform reflection classification. However, as the second correlation value is below the second threshold value, the device 110 may determine that the third sound track ST3 226 corresponds to separate sound source than the first sound track ST1 222.

While FIG. 4C illustrates a simplified example in which the device 110 determines the correlation 455, the disclosure is not limited thereto and the device 110 may determine the normalized cross-correlation data using other techniques without departing from the disclosure. For example, the device 110 may determine the first correlation value by performing a cross-correlation between a first power sequence associated with the first sound track ST1 222 and a second power sequence associated with the second sound track ST2 224 without departing from the disclosure. In some examples, the device 110 may determine the correlation 455 using additional information, such as a start time corresponding to a beginning of the first peak, an end time corresponding to an end of the first peak, FIG. 4D illustrates a classification example 460 in which the device 110 invokes the reflection classifier. As described above with regard to FIG. 3, the device 110 may invoke (326) a reflection classifier to determine classifier output data 470 and may assign the first track data or the second track data based on the classifier output data 470. For example, FIG. 4D illustrates an example in which the classifier output data 470 indicates that the first sound track ST1 222 corresponds to direct sound (e.g., direct sound waves and/or a direct sound source), whereas the second sound track ST2 224 corresponds to a reflection (e.g., reflected sound waves and/or a reflected sound source), although the disclosure is not limited thereto.

Figure 5A:
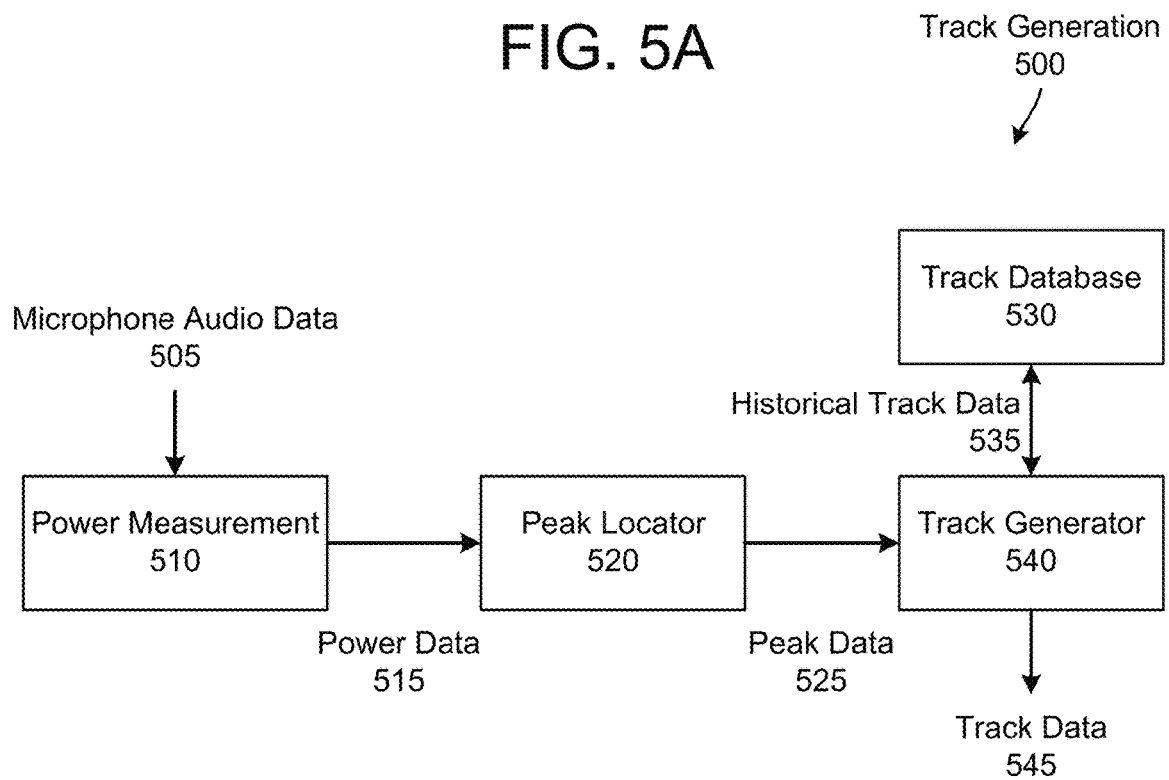
FIGS. 5A-5B illustrate example component diagrams for performing track generation and track classification according to examples of the present disclosure.
Figure 5B:
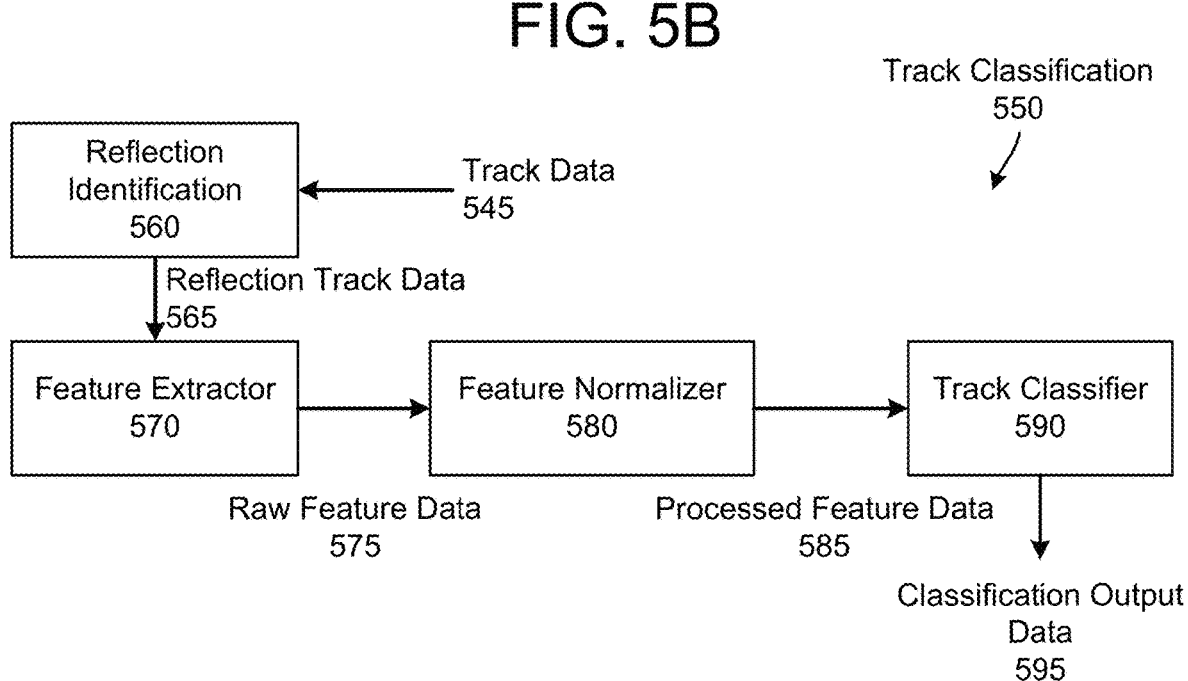

FIGS. 5A-5B illustrate example component diagrams for performing track generation and track classification according to examples of the present disclosure. As described above, track generation corresponds to identifying audible sounds and generating track data that includes one or more sound tracks representing the audible sounds. For example, the device 110 may monitor acoustical activity to detect a new audible sound and determine whether the audible sound corresponds to an existing sound track or a new sound track. Track classification, on the other hand, corresponds to identifying reflections represented in the track data and performing reflection classification to determine which sound track corresponds to the reflection. For example, the device 110 may determine that two sound tracks included in the track data are strongly correlated and the reflection classification may identify which of the two sound tracks corresponds to direct arrival of a sound source and which of the two sound tracks corresponds to a reflection of the sound source.

As illustrated in FIG. 5A, during track generation 500 a power measurement component 510 may receive microphone audio data 505 and may generate power data 515 corresponding to the microphone audio data 505. For example, the power measurement component 510 may generate the power data 515 as a function of space and time, such as by generating a power sequence associated with a single direction relative to the device 110.

The power measurement component 510 may output the power data 515 to a peak locator component 520 that is configured to identify peaks of power and generate peak data 525. For example, the peak locator component 520 may identify that a portion of the power data 515 exceeds a threshold value and may identify a start time, an end time, a location of the peak, a magnitude of the peak, and/or the like for the portion of the power data 515. In some examples, the peak locator component 520 may determine peak-to-valley ratio (PVR) values associated with the power data 515 by determining a maximum value (e.g., peak) and a minimum value (e.g., valley) associated with the power data 515. Thus, the PVR value indicates a ratio between a power peak and a power valley represented in the power data 515, and the PVR value may correspond to a volume (e.g., intensity, magnitude) associated with an audible sound. For example, the PVR value may vary within a range from one (e.g., minimum value) to infinity (e.g., maximum), with a higher number indicating a higher volume associated with the audible sound. In some examples, the peak locator component 520 may identify a peak represented in a portion of the power data 515 when the PVR value exceeds a threshold value (e.g., 1.1), although the disclosure is not limited thereto.

The peak locator component 520 may output the peak data 525 to a track generator component 540. The track generator component 540 may also receive historical track data 535 from a track database 530, which represents already established sound tracks. The track generator component 540 may identify a peak represented in the peak data 525, determine a direction relative to the device 110 and/or a position of the sound source associated with the peak, compare the peak, the direction, and/or the position to the historical track data 535, and determine whether the peak corresponds to an established sound track. If the peak corresponds to an established sound track, the track generator component 540 may associate the peak with the established sound track. However, if the peak does not correspond to an established sound track, the track generator component 540 may generate a new sound track associated with the peak. Thus, the track generator component 540 may generate track data 545 representing one or more sound tracks that represent acoustical activity in the environment 20.

As illustrated in FIG. 5B, during track classification 550 a reflection identification component 560 may receive the track data 545 generated by the track generator component 540 and may determine reflection track data 565. For example, the reflection track data 565 may indicate individual pair(s) of sound tracks that correspond to a reflection. For example, the reflection track data 565 may indicate that a first sound track and a second sound track are strongly correlated, indicating that one of the first sound track or the second sound track is a reflection of the other. If none of the sound tracks represented in the track data 545 correspond to a reflection, the reflection track data 565 may indicate that no reflections are detected, although the disclosure is not limited thereto and the reflection track data 565 may be blank without departing from the disclosure.

If the reflection track data 565 indicates a pair of sound tracks, a feature extractor component 570 may extract features from the sound tracks to generate raw feature data 575. For example, the feature extractor component 570 may extract features such as signal-to-noise ratio (SNR) values, peak-to-valley ratio (PVR) values, confidence score values, and/or the like, as described in greater detail below with regard to FIGS. 7A-7B.

The feature extractor component 570 may output the raw feature data 575 to a feature normalization component 580 that is configured to generate processed feature data 585. For example, the feature normalizer component 570 may normalize individual features included in the raw feature data 575, such that each feature falls within a desired range of values (e.g., −1 to 1, although the disclosure is not limited thereto). In some examples, the feature normalizer component 570 may determine an average value (e.g., mean) for an individual feature by averaging a first plurality of feature values associated with the individual feature. After determining the average value, the feature normalizer component 570 may subtract the average value from each feature value of the first plurality of feature values in order to generate a second plurality of feature values. Subtracting the average value effectively shifts the second plurality of feature values to be centered on zero (e.g., average value of the second plurality of feature values is equal to zero). In addition, the feature normalizer component 580 may determine a maximum feature value represented in the second plurality of feature values and may divide each feature value of the second plurality of feature values by the maximum feature value to generate a third plurality of feature values. As a result of these operations, the third plurality of feature values falls within the desired range of values (e.g., −1 to 1) and is centered on zero.

The feature normalizer component 580 may output the processed feature data 585 to a track classifier component 590 that is configured to perform reflection classification and generate classification output data 595. For example, the track classifier component 590 may be a trained model configured to process the features included in the processed feature data 585 to determine whether the first sound track or the second sound track corresponds to a reflection.

Figure 6A:
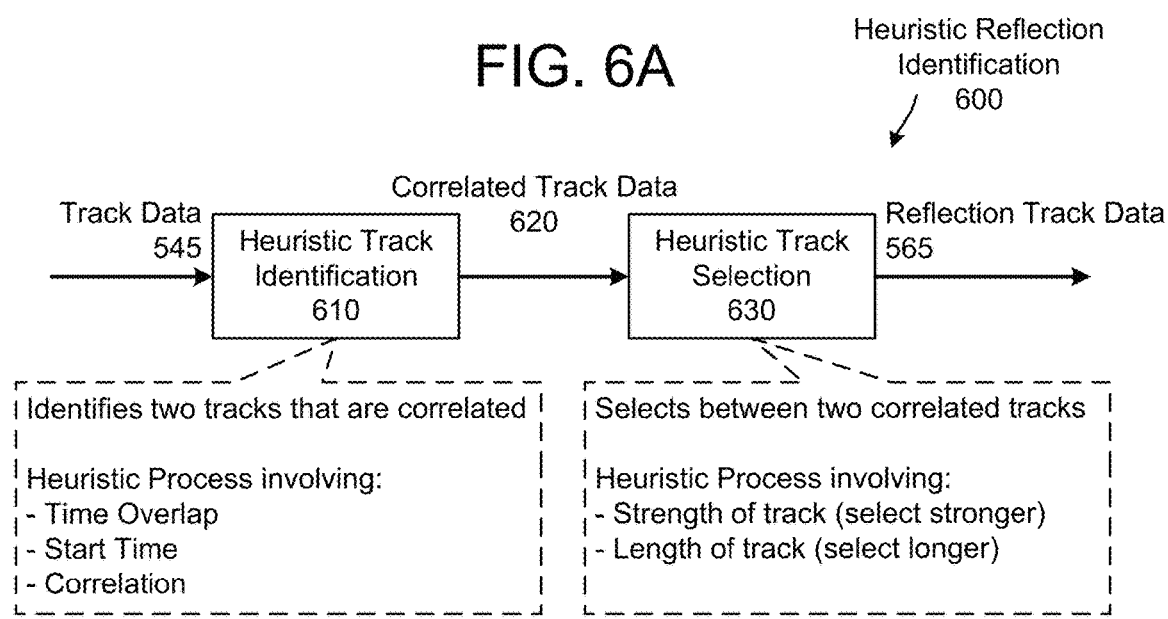
FIGS. 6A-6C illustrate example component diagrams for performing reflection identification according to examples of the present disclosure.
Figure 6B:
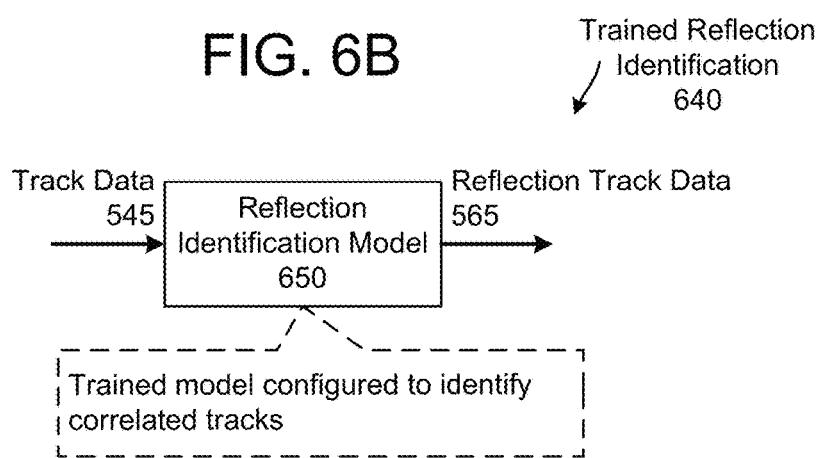
Figure 6C:
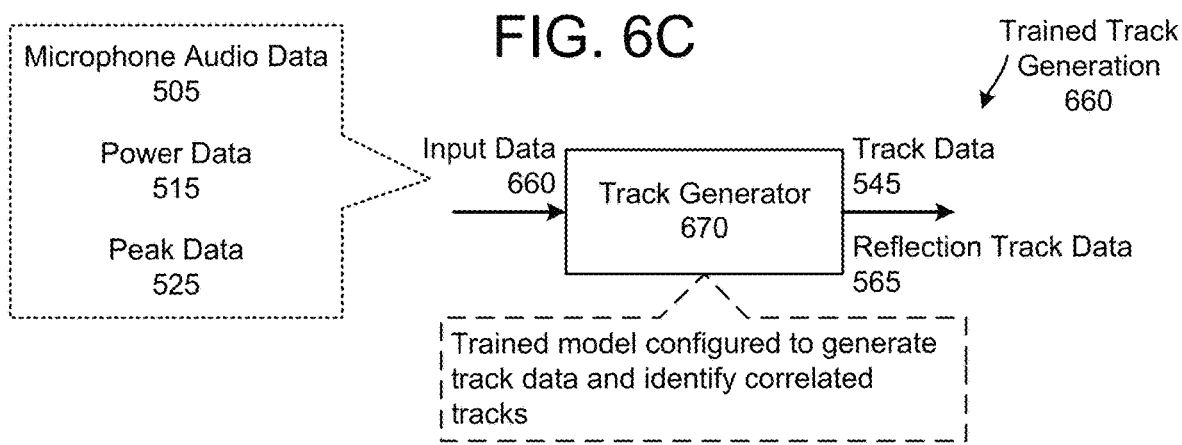

FIGS. 6A-6C illustrate example component diagrams for performing reflection identification according to examples of the present disclosure. As illustrated in FIGS. 6A-6C, the reflection identification component 560 may be implemented using three different techniques. For example, FIG. 6A illustrates a first technique in which the reflection identification component 560 corresponds to heuristic reflection identification 600 (e.g., set of rules used to identify sound tracks that are strongly correlated), whereas FIG. 6B illustrates a second technique in which the reflection identification component 560 corresponds to trained reflection identification 640 (e.g., trained model is configured to identify sound tracks that are strongly correlated). As illustrated in FIG. 6C, in some examples the track generator component 540 and the reflection identification component 560 may be combined in a single component using a third technique (e.g., trained track generation 660).

As illustrated in FIG. 6A, the heuristic reflection identification 600 corresponds to two components configured to apply a set of rules to identify that two sound tracks are correlated and/or select between the two sound tracks. For example, a heuristic track identification component 610 may receive the track data 545 and apply a first set of rules to generate correlated track data 620. Examples of these rules are illustrated in FIGS. 3 and 4A-4C and correspond to determining whether two sound tracks are correlated based on a time overlap, start times, and/or correlation (e.g., normalized cross-correlation), although the disclosure is not limited thereto.

A heuristic track selection component 630 may receive the correlated track data 620 and may apply a second set of rules to generate the reflection track data 565. For example, the heuristic track selection may select between the first sound track and the second sound track based on a strength of sound track (e.g., select the stronger sound track based on a signal quality metric value), a length of sound track (e.g., select the sound track having a longer history), and/or the like. If one of the second set of rules applies to the correlated track data 620, the heuristic track selection 630 assigns one of the first sound track or the second sound track as a reflection and the device 110 doesn't need to perform reflection classification for the correlated sound tracks.

As illustrated in FIG. 6B, the trained reflection identification 640 corresponds to a single component trained to identify correlated sound tracks and generate the reflection track data 565. For example, a reflection identification model component 650 may be configured to process the track data 545 to generate the reflection track data 665. The reflection identification model component 650 may include a machine learning model, such as a deep neural network (DNN) or the like, without departing from the disclosure.

As illustrated in FIG. 6C, the trained track generation 660 corresponds to a single component trained to generate the sound tracks and identify correlated sound tracks. For example, a track generator component 670 may receive input data 660 and may process the input data 660 to generate the track data 545 and the reflection track data 565. As illustrated in FIG. 6C, the input data 660 may correspond to the microphone audio data 505, the power data 515, the peak data 525, and/or other data useful in generating the sound tracks. The track generator component 670 may include a machine learning model, such as a deep neural network (DNN) or the like, without departing from the disclosure.

FIGS. 7A-7B illustrate example component diagrams for performing feature extraction according to examples of the present disclosure. As illustrated in FIG. 7A, in some examples a first feature extractor component 570a may determine basic features 700 such as first raw feature data 575a. For example, the first raw feature data 575a may include signal-to-noise ratio (SNR) values, peak-to-valley ratio (PVR) values, confidence score values, and/or the like.

As used herein, SNR values associated with the first sound track may be calculated by estimating a noise floor of the first sound track and comparing power values of the first sound track to the estimated noise floor. For example, the feature extractor component 570 may determine a first power value of the first sound track and divide the first power value by the estimated noise floor to generate a first SNR value. Similarly, PVR values associated with the first sound track may be calculated by determining a maximum value (e.g., peak) and a minimum value (e.g., valley) associated with the first sound track. For example, the feature extractor component 570 may determine a first PVR value by dividing the maximum value by the minimum value, although the disclosure is not limited thereto. Thus, the PVR value indicates a ratio between a power peak and a power valley represented in the first sound track, and the PVR value may correspond to a volume (e.g., intensity, magnitude) associated with an audible sound. For example, the PVR value may vary within a range from one (e.g., minimum value) to infinity (e.g., maximum), with a higher number indicating a higher volume associated with the audible sound. In some examples, the device 110 may detect a peak represented in the first sound track when the PVR value exceeds a threshold value (e.g., 1.1), although the disclosure is not limited thereto.

As illustrated in FIG. 7B, in some examples a second feature extractor component 570b may determine expanded features 720 such as second raw feature data 575b. For example, the second raw feature data 575b may include signal-to-noise ratio (SNR) values, peak-to-valley ratio (PVR) values, confidence score values, peak cross-correlation value(s), a position of the peak cross-correlation value(s), cross-correlation values, relative power ratio values, power comparison values, normalized initial power difference value, normalized power mean difference value, other power sequence features, direction sequence features, and/or the like.

The feature extractor component 570 may determine the SNR values and/or the PVR values for the first sound track (e.g., Track0) and the second sound track (e.g., Track1) as described above. In addition, the feature extractor component 570 may align the power sequences for the first sound track and the second sound track so that they are synchronized in time. For example, the feature extractor component 570 may determine a first start position for the first sound track and a second start position for the second sound track and determine a time offset (e.g., difference between the first start position and the second start position) so that peaks represented in the power sequences are aligned. However, the disclosure is not limited thereto and the feature extractor component 570 may align the power sequences for the first sound track and the second sound track using other techniques without departing from the disclosure.

After aligning the power sequences between the first sound track and the second sound track, the feature extractor component 570 may determine boundaries for the power sequences. For example, the feature extractor component 570 may determine a portion of the power sequences that are larger than a variable threshold value. To illustrate an example, the feature extractor component 570 may determine a first peak power value associated with the first sound track and may multiply the first peak power value by a desired percentage to determine a first threshold value. The feature extractor component 570 may then use the first threshold value to identify portions of the first sound track that exceed the first threshold value. Similarly, the feature extractor component 570 may determine a second peak power value associated with the second sound track and may multiply the second peak power value by the desired percentage to determine a second threshold value. The feature extractor component 570 may then use the second threshold value to identify portions of the second sound track that exceed the second threshold value. Based on the portions of the first sound track that exceed the first threshold value, the feature extractor component 570 may determine first bounds for the first sound track. Similarly, based on the portions of the second sound track that exceed the second threshold value, the feature extractor component 570 may determine second bounds for the second sound track.

Using the boundaries determined above, the feature extractor component 570 may determine a value indicating a percentage of each sound track that is larger than the corresponding threshold value. For example, the feature extractor component 570 may determine a first value indicating that a first percentage of the first sound track exceeds the first threshold value, and a second value indicating that a second percentage of the second sound track exceeds the second threshold value.

In some examples, the feature extractor component 570 may determine a mean (e.g., average value) for the first sound track and the second sound track. For example, the feature extractor component 570 may determine a first mean value based on the first sound track (e.g., average value for the first percentage of the first sound track) and determine a second mean value based on the second sound track (e.g., average value for the second percentage of the second sound track). The feature extractor component 570 may then modify the first sound track and the second sound track by subtracting the mean values. For example, the feature extractor component 570 may subtract the first mean value from each sample included in the first sound track and may subtract the second mean value from each sample included in the second sound track.

The feature extractor component 570 may determine a first SNR value (e.g., SNR0) for the first sound track (e.g., Track0) and a second SNR value (e.g., SNR1) for the second sound track (e.g., Track1). Similarly, the feature extractor component 570 may determine a first PVR value (e.g., PVR0) for the first sound track and a second PVR value (e.g., PVR1) for the second sound track. In some examples, the feature extractor component 570 may use the first SNR value and the first PVR value to determine a first confidence value (e.g., Confidence0) for the first sound track. Similarly, the feature extractor component 570 may use the second SNR value and the second PVR value to determine a second confidence value (e.g., Confidence1) for the second sound track.

The feature extractor component 570 may determine cross-correlation values between the first sound track and the second sound track. For example, the feature extractor component 570 may calculate cross-correlation values between the first sound track and the second sound track and may determine a peak cross-correlation value from the cross-correlation values. The feature extractor component 570 may determine both a magnitude of the peak cross-correlation value and a position of the peak cross-correlation value (e.g., location of the cross-correlation peak for the correlation sequence). In some examples, the position of the peak cross-correlation value may be relative to the cross-correlation sequence itself (e.g., sample within the cross-correlation sequence). However, the disclosure is not limited thereto, and in other examples the position of the peak cross-correlation value may be an absolute value relative to the first sound track and/or the like.

The feature extractor component 570 may determine relative power ratio values and/or power comparison values using the first sound track and the second sound track. For example, the feature extractor component 570 may determine a sequence of difference values between the first sound track and the second sound track using the following equation:

$$d = P0[m] - P1[m] \quad [1]$$

where d represents the difference value for a particular sample m, P0[m] represents a first power value of the first sound track for the sample m, and P1[m] represents a second power value of the second sound track for the sample m.

The feature extractor component 570 may calculate the relative power ratio value as a ratio between a sum of positive difference values and a sum of absolute difference values. For example, the feature extractor component 570 may calculate a first sum using only positive values of the sequence of difference values (e.g., Sum1 is generated by summing only values for which the difference d>0, which means that the first sound track is larger than the second sound track) and a second sum using absolute values of the sequence of difference values (e.g., Sum2 is generated by summing absolute values for each difference value). Thus, the feature extractor component 570 may calculate the relative power ratio value by dividing the first sum by the second sum (e.g., PowerRatio=100*Sum1/Sum2), although the disclosure is not limited thereto.

In some examples, the feature extractor component 570 may determine a percentage of larger power values for Track0 with respect to Track1 at the beginning portions of the tracks, using the time and space smoothed versions of the power sequences. Additionally or alternatively, the feature extractor component 570 may determine a percentage of larger power values for Track0 with respect to Track1 at the beginning portions of the tracks, using the original power sequences without any smoothing.

In some examples, the feature extractor component 570 may calculate a normalized initial power difference value and/or normalized power mean difference value for the first sound track and the second sound track. For example, the feature extractor component 570 may determine the normalized initial power smoothed difference by summing smoothed power values associated with initial portions of the first sound track (e.g., Track0) and the second sound track (e.g., Track1). Thus, the feature extractor component 570 may determine a first sum by summing first smoothed power values associated with the initial portion of the first sound track and determine a second sum by summing second smoothed power values associated with the initial portion of the second sound track. The feature extractor component 570 may calculate the normalized initial power difference value by calculating a ratio between the difference of the two quantities (e.g., difference between the first sum and the second sum) and a combination of the two quantities (e.g., sum of the first sum and the second sum). Additionally or alternatively, the feature extractor component 570 may perform a similar process to determine a normalized power smoothed mean difference, although the disclosure is not limited thereto.

While the above description illustrates several examples of power sequence features, the disclosure is not limited thereto and the feature extractor component 570 may extract additional feature data based on the power sequences. Additionally or alternatively, the feature extractor component 570 may extract feature data based on direction sequences associated with the first sound track and the second sound track. For example, if the device 110 moves, a position of the first sound source and/or the second sound source may vary based on movement of the device 110. Thus, while the feature extractor component 570 may determine that the directions associated with the sound sources (e.g., position of the sound sources relative to the device 110) changed, the feature extractor component 570 may determine that the relative position of the sound sources is unchanged (e.g., difference between the directions is the same). In contrast, if the first sound source moves relative to the device 110, the feature extractor component 570 may determine that the relative position of the first sound source changed based on the difference between the first direction of the first sound source and the second direction of the second sound source changing over time. The disclosure is not limited thereto, however, and the feature extractor component 570 may extract additional feature data based on the direction sequences without departing from the disclosure.

FIG. 8 illustrates an example component diagram for performing sound source localization according to examples of the present disclosure. As illustrated in FIG. 8, the device 110 may perform sound source localization (SSL) using the track data 545 and the classification output data 595. For example, FIG. 8 illustrates that a sound source localization (SSL) component 810 may receive the track data 545 from the track generator component 540 and the classification output data 595 from the track classifier component 590 and may generate SSL data 820.

As illustrated in the sound source chart 830 and the SSL data chart 840, the SSL data 820 may correspond to the track data 545 but may omit reflected sound sources. For example, the SSL data 820 includes the first sound source corresponding to the first user 5a (e.g., SSL1) but does not include a sound source corresponding to the reflection of the first sound source. As illustrated in the sound source chart 830 and the SSL data chart 840, the SSL data 820 may include a first sound source SSL1 822 corresponding to the first user 5a, a second sound source SSL2 824 corresponding to the third user 5c, and a third sound source SSL3 826 corresponding to the second user 5b.

While FIG. 8 illustrates an example in which the SSL data 820 corresponds to the track data 545, the disclosure is not limited thereto and the SSL data 820 may vary from the track data 545 without departing from the disclosure. For example, the track data 545 may corresponds to a series of power values, whereas the SSL data 820 may correspond to the binary output illustrated in the SSL data chart 840. However, the disclosure is not limited thereto and the track data 545 and/or the SSL data 820 may vary without departing from the disclosure.

Thus, the device 110 may be configured to track a sound source over time. For example, the device 110 may track the sound source even as the device 110 and/or the sound source move relative to each other. In some examples, the SSL data 820 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

Figure 9:
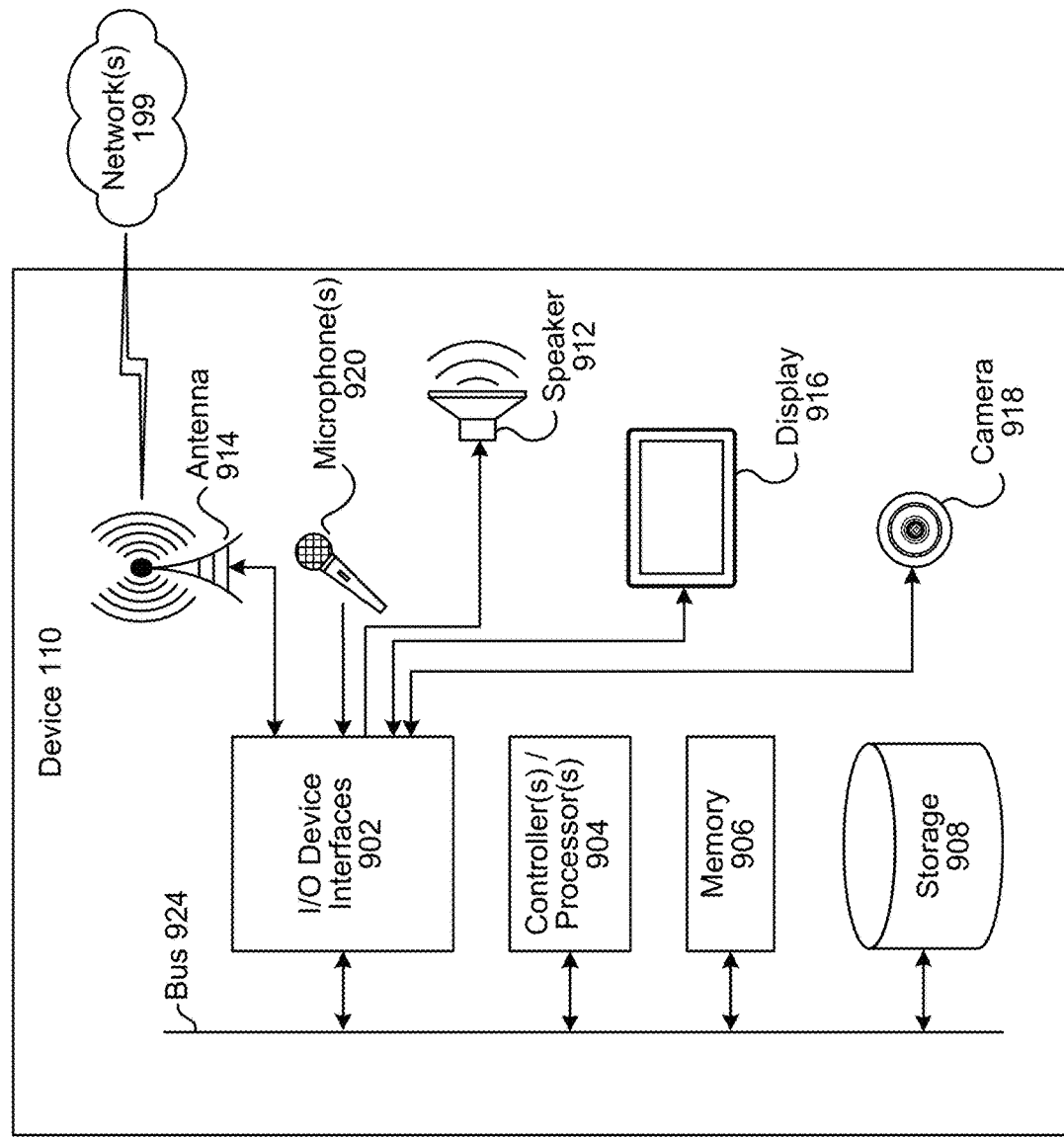
FIG. 9 is a block diagram conceptually illustrating example components of a device according to embodiments of the present disclosure.
Figure 10:
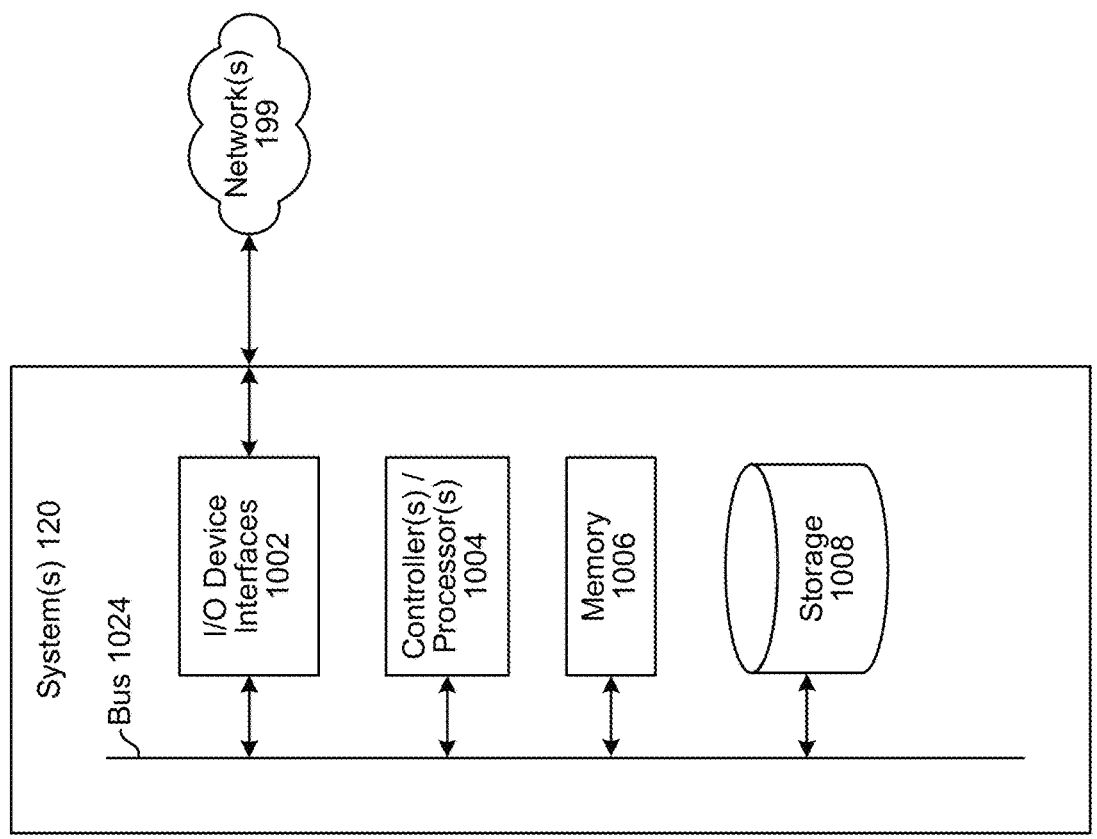
FIG. 10 is a block diagram conceptually illustrating example components of a remote system according to embodiments of the present disclosure.

FIG. 9 is a block diagram conceptually illustrating a device 110 that may be used with the system. FIG. 10 is a block diagram conceptually illustrating example components of a remote system 120, such as a natural language processing system(s), which may assist with natural language processing such as automatic speech recognition (ASR) processing, natural language understanding (NLU) processing, and/or the like. Multiple remote systems 120 may be included in the overall system 100 of the present disclosure, such as one or more natural language processing systems for performing ASR processing, one or more natural language processing systems for performing NLU processing, etc. In operation, each of these systems may include computer-readable and computer-executable instructions that reside on the respective remote system 120, as will be discussed further below.

A remote system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each device 110 and/or remote system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device 110 and/or remote system 120 may also include a data storage component (908/1008) for storing data and controller/processor-executable instructions. Each data storage component (908/1008) may individually include one or more non-volatile storage types such as magnetic storage, optical storage, solid-state storage, etc. Each device 110 and/or remote system 120 may also be connected to removable or external non-volatile memory and/or storage (such as a removable memory card, memory key drive, networked storage, etc.) through respective input/output device interfaces (902/1002).

Computer instructions for operating each device 110 and/or remote system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device 110 and/or remote system 120 includes input/output device interfaces (902/1002). A variety of components may be connected through the input/output device interfaces (902/1002), as will be discussed further below. Additionally, each device 110 and/or remote system 120 may include an address/data bus (924/1024) for conveying data among components of the respective device. Each component within a device 110 and/or remote system 120 may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content and/or a camera 818 to capture image data, although the disclosure is not limited thereto.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110 and the remote system(s) 120 may include their own dedicated processors, memory, and/or storage. Alternatively, one or more of the components of the device(s) 110 and/or the remote system(s) 120 may utilize the I/O interfaces (902/1002), processor(s) (904/1004), memory (906/1006), and/or storage (908/1008) of the device(s) 110 and remote system(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the remote system(s) 120, as described herein, are illustrative, and may be located as a stand-alone device or may be included, in whole or in part, as a component of a larger device or system.

As illustrated in FIG. 11, multiple devices (110a-110g and 120) may contain components of the system and the devices may be connected over a network(s) 199. The network(s) 199 may include a local or private network or may include a wide network such as the Internet. Devices may be connected to the network(s) 199 through either wired or wireless connections. As illustrated in FIG. 11, a tablet computer 110a, a smart phone 110b, a smart watch 110c, speech-detection device(s) with a display 110d, speech-detection device(s) 110e, input/output (I/O) limited device(s) 110f, and/or a smart television (TV) 110g may be connected to the network(s) 199 through a wired and/or wireless connection. For example, the devices 110 may be connected to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like.

Other devices are included as network-connected support devices, such as the remote system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving first data corresponding to a first direction relative to a device, the first data representing a first series of power values, the first series of power values derived from first audio data that includes a first representation of an audible sound generated by a first sound source;
    receiving second data corresponding to a second direction relative to the device, the second data representing a second series of power values, the second series of power values derived from second audio data that includes a second representation of the audible sound;
    determining that the first data and the second data are correlated;
    generating, using the first data and the second data, third data;
    processing the third data using a first model to generate fourth data; and
    determining, using the fourth data, that the second data corresponds to an acoustic reflection of the audible sound.

2. The computer-implemented method of claim 1, further comprising:
    determining that first audio generated by the first sound source is represented in a first portion of third audio data, the first portion of the third audio data including the first audio data;
    determining that second audio generated by a second sound source is represented in a second portion of the third audio data;
    determining that a wakeword is represented in the first portion of the third audio data; and
    causing language processing to be performed on the first portion of the third audio data.

3. The computer-implemented method of claim 1, wherein determining that the first data and the second data are correlated further comprises:
    determining that a first pulse is represented in the first data during a first time window;
    determining that a second pulse is represented in the second data during the first time window;
    determining first timestamp data corresponding to a beginning of the first pulse;
    determining second timestamp data corresponding to a beginning of the second pulse;
    determining, using the first timestamp data and the second timestamp data, a time delay between the first pulse and the second pulse;
    determining that the time delay is below a threshold value; and
    determining that the first data and the second data are correlated.

4. The computer-implemented method of claim 1, wherein determining that the first data and the second data are correlated further comprises:
    determining that a first pulse is represented in the first data during a first time window;
    determining that a second pulse is represented in the second data during the first time window;
    determining a correlation value by calculating a cross-correlation between the first data and the second data within the first time window;
    determining that the correlation value is above a threshold value; and
    determining that the first data and the second data are correlated.

5. The computer-implemented method of claim 1, wherein generating the third data further comprises:
    determining a first signal-to-noise ratio (SNR) value corresponding to the first data;
    determining a second SNR value corresponding to the second data;
    determining a first peak-to-valley (PVR) value corresponding to the first data;

determining a second PVR value corresponding to the second data;
determining, using the first SNR value and the first PVR value, a first value corresponding to the first data; and
determining, using the second SNR value and the second PVR value, a second value corresponding to the second data,
wherein the third data includes the first SNR value, the second SNR value, the first PVR value, the second PVR value, the first value, and the second value.

6. The computer-implemented method of claim 1, wherein the first audio data and the second audio data are generated based on audio received by a first microphone and a second microphone, respectively, the method further comprising:
determining, using the first audio data, a first plurality of power values that includes the first series of power values;
determining, using the second audio data, a second plurality of power values that includes the second series of power values;
generating, using the first plurality of power values, the first data; and
generating, using the second plurality of power values, the second data.

7. The computer-implemented method of claim 1, wherein receiving the first data further comprises:
receiving first audio data corresponding to the first direction;
determining, using the first audio data, a first plurality of power values that includes the first series of power values;
determining a threshold value using the first plurality of power values;
determining that each of the first series of power values exceeds the threshold value;
determining that the first series of power values corresponds to the first sound source; and
generating the first data using the first series of power values.

8. The computer-implemented method of claim 1, wherein receiving the first data further comprises:
determining, using the first audio data, a first plurality of power values that includes the first series of power values;
determining that the first series of power values exceeds a threshold value;
determining a start time associated with a first power value at a beginning of the first series of power values;
determining an end time associated with a second power value at an end of the first series of power values;
determining a maximum power value from among the first series of power values; and
generating the first data, wherein the first data indicates the first direction, the start time, the end time, and the maximum power value.

9. The computer-implemented method of claim 1, wherein the first model corresponds to a neural network trained to distinguish between direct arrival of the audible sound and the acoustic reflection of the audible sound.

10. The computer-implemented method of claim 1, further comprising:
receiving fifth data corresponding to a third direction relative to the device, the fifth data representing a third series of power values, the third series of power values derived from third audio data that includes a representation of a second audible sound generated by a second sound source;
determining that the first data and the fifth data are not correlated; and
determining that the fifth data corresponds to the second sound source that is different than the first sound source.

11. A system comprising:
at least one processor; and
memory including instructions operable to be executed by the at least one processor to cause the system to:
receive first data corresponding to a first direction relative to a device, the first data representing a first series of power values, the first series of power values derived from first audio data that includes a first representation of an audible sound generated by a first sound source;
receive second data corresponding to a second direction relative to the device, the second data representing a second series of power values, the second series of power values derived from second audio data that includes a second representation of the audible sound;
determine that the first data and the second data are correlated;
generate, using the first data and the second data, third data;
process the third data using a first model to generate fourth data; and
determine, using the fourth data, that the second data corresponds to an acoustic reflection of the audible sound.

12. The system of claim 11, wherein the memory further comprises instructions that, when executed by the at least one processor, further cause the system to:
determine that first audio generated by the first sound source is represented in a first portion of third audio data, the first portion of the third audio data including the first audio data;
determine that second audio generated by a second sound source is represented in a second portion of the third audio data;
determine that a wakeword is represented in the first portion of the third audio data; and
cause language processing to be performed on the first portion of the third audio data.

13. The system of claim 11, wherein the memory further comprises instructions that, when executed by the at least one processor, further cause the system to:
determine that a first pulse is represented in the first data during a first time window;
determine that a second pulse is represented in the second data during the first time window;
determine first timestamp data corresponding to a beginning of the first pulse;
determine second timestamp data corresponding to a beginning of the second pulse;
determine, using the first timestamp data and the second timestamp data, a time delay between the first pulse and the second pulse;
determine that the time delay is below a threshold value; and
determine that the first data and the second data are correlated.

14. The system of claim 11, wherein the memory further comprises instructions that, when executed by the at least one processor, further cause the system to:
- determine that a first pulse is represented in the first data during a first time window;
- determine that a second pulse is represented in the second data during the first time window;
- determine a correlation value by calculating a cross-correlation between the first data and the second data within the first time window;
- determine that the correlation value is above a threshold value; and
- determine that the first data and the second data are correlated.

15. The system of claim 11, wherein the memory further comprises instructions that, when executed by the at least one processor, further cause the system to:
- determine a first signal-to-noise ratio (SNR) value corresponding to the first data;
- determine a second SNR value corresponding to the second data;
- determine a first peak-to-valley (PVR) value corresponding to the first data;
- determine a second PVR value corresponding to the second data;
- determine, using the first SNR value and the first PVR value, a first value corresponding to the first data; and
- determine, using the second SNR value and the second PVR value, a second value corresponding to the second data,
- wherein the third data includes the first SNR value, the second SNR value, the first PVR value, the second PVR value, the first value, and the second value.

16. The system of claim 11, wherein the first audio data and the second audio data are generated based on audio received by a first microphone and a second microphone, respectively, and the memory further comprises instructions that, when executed by the at least one processor, further cause the system to:
- determine, using the first audio data, a first plurality of power values that includes the first series of power values;
- determine, using the second audio data, a second plurality of power values that includes the second series of power values;
- generate, using the first plurality of power values, the first data; and
- generate, using the second plurality of power values, the second data.

17. The system of claim 11, wherein the memory further comprises instructions that, when executed by the at least one processor, further cause the system to:
- receive first audio data corresponding to the first direction;
- determine, using the first audio data, a first plurality of power values that includes the first series of power values;
- determine a threshold value using the first plurality of power values;
- determine that each of the first series of power values exceeds the threshold value;
- determine that the first series of power values corresponds to the first sound source; and
- generate the first data using the first series of power values.

18. The system of claim 11, wherein the memory further comprises instructions that, when executed by the at least one processor, further cause the system to:
- determine, using the first audio data, a first plurality of power values that includes the first series of power values;
- determine that the first series of power values exceeds a threshold value;
- determine a start time associated with a first power value at a beginning of the first series of power values;
- determine an end time associated with a second power value at an end of the first series of power values;
- determine a maximum power value from among the first series of power values; and
- generate the first data, wherein the first data indicates the first direction, the start time, the end time, and the maximum power value.

19. The system of claim 11, wherein the first model corresponds to a neural network trained to distinguish between direct arrival of the audible sound and the acoustic reflection of the audible sound.

20. The system of claim 11, wherein the memory further comprises instructions that, when executed by the at least one processor, further cause the system to:
- receive fifth data corresponding to a third direction relative to the device, the fifth data representing a third series of power values, the third series of power values derived from third audio data that includes a representation of a second audible sound generated by a second sound source;
- determine that the first data and the fifth data are not correlated; and
- determine that the fifth data corresponds to the second sound source that is different than the first sound source.

* * * * *